US012634768B2

(12) United States Patent (10) Patent No.: US 12,634,768 B2
Hu et al. (45) Date of Patent: May 19, 2026

(54) CONFIGURATION OF APPLICATION LAYER QUALITY OF EXPERIENCE (QOE) MEASUREMENT

(71) Applicant: HUAWEI TECHNOLOGIES CO., LTD., Guangdong (CN)

(72) Inventors: Xingxing Hu, Shanghai (CN); Hongping Zhang, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 613 days.

(21) Appl. No.: 17/986,238

(22) Filed: Nov. 14, 2022

(65) Prior Publication Data

US 2023/0080089 A1 Mar. 16, 2023

Related U.S. Application Data

(63) Continuation of application No. PCT/CN2021/093092, filed on May 11, 2021.

(30) Foreign Application Priority Data

May 15, 2020 (CN) .......................... 202010414606.5
Oct. 20, 2020 (CN) .......................... 202011127030.0

(51) Int. Cl.
*H04W 28/24* (2009.01)
*H04W 24/10* (2009.01)

(52) U.S. Cl.
CPC ........... *H04W 28/24* (2013.01); *H04W 24/10* (2013.01)

(58) Field of Classification Search
CPC ..... H04W 28/24; H04W 24/10; H04W 24/08; H04W 24/02; H04L 41/5067
(Continued)

(56) References Cited

U.S. PATENT DOCUMENTS

2013/0053017 A1 2/2013 Chang
2014/0087716 A1* 3/2014 Vaderna ................ H04W 24/08
455/422.1
(Continued)

FOREIGN PATENT DOCUMENTS

CN 102938905 A 2/2013
CN 110870339 A 3/2020
(Continued)

OTHER PUBLICATIONS

Telefon AB LM Ericsson et al., "QoE Compression for MBMS," 3GPP TSG-SA4 Meeting #54, S4-090453, Ystad, Sweden, Jun. 22-26, 2009, 4 pages.

(Continued)

*Primary Examiner* — Ricardo H Castaneyra
(74) *Attorney, Agent, or Firm* — Fish & Richardson P.C.

(57) ABSTRACT

This application provides a communication method and a communication apparatus. The communication method includes: An access network device receives first configuration information, where the first configuration information indicates a terminal device to perform application layer quality of experience QoE measurement; the access network device generates second configuration information, where the second configuration information indicates the terminal device to report measurement result of at least one measurement metric obtained through the QoE measurement; and the access network device sends the first configuration information and the second configuration information to the terminal device.

22 Claims, 14 Drawing Sheets

(58) Field of Classification Search

USPC ................ 370/230, 252, 235, 231, 229, 329

See application file for complete search history.

(56) References Cited

U.S. PATENT DOCUMENTS

| | | | |
|---|---|---|---|
| 2018/0041913 A1 | 2/2018 | Zhu et al. | |
| 2020/0162949 A1* | 5/2020 | He | H04W 24/08 |
| 2020/0280498 A1* | 9/2020 | Eklöf | H04L 65/80 |

FOREIGN PATENT DOCUMENTS

| | | |
|---|---|---|
| CN | 110972179 A | 4/2020 |
| CN | 113676930 A | 11/2021 |
| EP | 2779718 B1 | 8/2018 |
| JP | 7581379 B2 | 11/2024 |
| WO | 2019010606 A1 | 1/2019 |
| WO | 2022211695 A1 | 10/2022 |

OTHER PUBLICATIONS

Office Action in Japanese Appln. No. 2022-569184, mailed on May 20, 2024, 9 pages (with English translation).

3GPP TS 26.114 V16.5.2, "3rd Generation Partnership Project; Technical Specification Group Services and System Aspects; IP Multimedia Subsystem (IMS); Multimedia Telephony; Media Handling and Interaction (Release 16)," Mar. 2020, 446 pages.

3GPP TS 26.247 V16.2.0, "3rd Generation Partnership Project; Technical Specification Group Services and System Aspects; Transparent End-to-End Packet-Switched Streaming Service (PSS); Progressive Download and Dynamic Adaptive Streaming over HTTP (3GP-DASH) (Release 16)," Dec. 2019, 139 pages.

3GPP TS 36.413 V16.1.0, "3rd Generation Partnership Project; Technical Specification Group Radio Access Network; Evolved Universal Terrestrial Radio Access Network(E-UTRAN); S1 Application Protocol (S1AP) (Release 16)," Mar. 2020, 391 pages.

3GPP TS 38.300 V16.1.0, "3rd Generation Partnership Project; Technical Specification Group Radio Access Network; NR; NR and NG-RAN Overall Description; Stage 2 (Release 16)," Mar. 2020, 133 pages.

3GPP TS 38.331 V16.0.0, "3rd Generation Partnership Project; Technical Specification Group Radio Access Network; NR; Radio Resource Control (RRC) Protocol Specification (Release 16)," Mar. 2020, 835 pages.

3GPP TS 38.413 V16.1.0, "3rd Generation Partnership Project; Technical Specification Group Radio Access Network; NG-RAN; NG Application Protocol (NGAP)(Release 16)," Mar. 2020, 341 pages.

3GPP TS 38.423 V16.1.0, "3rd Generation Partnership Project; Technical Specification Group Radio Access Network; NG-RAN; Xn Application Protocol (XnAP)(Release 16)," Mar. 2020, 334 pages.

3GPP TS 38.473 V15.9.0, "3rd Generation Partnership Project; Technical Specification Group Radio Access Network; NG-RAN; F1 Application Protocol (F1AP) (Release 15), " Mar. 2020, 222 pages.

International Search Report and Written Opinion in International Appln. No. PCT/CN2021/093092, mailed on Aug. 10, 2021, 13 pages (with English translation).

3GPP TR 38.890 V0.3.0, "3rd Generation Partnership Project; Technical Specification Group Radio Access Network; Study on NR QoE management and optimizations for diverse services (Release 17)," Feb. 2021, 18 pages.

Nokia et al., "Consideration on QoE scope," 3GPP TSG-RAN WG2 Meeting #113bis Electronic, R2-2103555, Elbonia, Apr. 12-20, 2021, 5 pages.

Extended European Search Report in European Appln No. 21804761. 1, dated Aug. 11, 2023, 13 pages.

Office Action in Indian Appln. No. 202237066245, mailed on Aug. 16, 2023, 7 pages (with English translation).

Ericsson LM, "Discussion on incoming LS on QoE Measurement Collection," 3GPP TSG SA WG4#106, S4-191144, Busan, South Korea, Oct. 21-25, 2019, 6 pages.

Huawei et al., "Discussion QoE Measurement Collection for streaming services in UTRAN," 3GPP TSG-RAN WG2 #95bis, R2-166442, Kaohsiung, Oct. 10-14, 2016, 22 pages.

CTA, "LS on Request of comments on CTA-2066—QoE document," 3GPP TSG SA WG4 #103, S4-190289, Newport Beach, CA, USA, Apr. 8-12, 2019, 29 pages.

Qualcomm Incorporated, "MTSI QoE Metrics and MDT," 3GPP TSG-RAN WG2 Meeting #89bis, R2-151611, Bratislava, Slovakia, Apr. 20-24, 2015, 5 pages.

Ericsson LM, "New VR metrics clause," 3GPP TSG-SA4 Meeting #104, S4-190654, Cork, Ireland, Jun. 1-5, 2019, 12 pages.

Office Action in Japanese Appln. No. 2022-569184, mailed on Oct. 23, 2023, 9 pages (with English translation).

Office Action in Mexican Appln. No. 2022/014371, mailed on May 9, 2025, 6 pages (with English translation).

* cited by examiner

700

800

900

1300

1400

CONFIGURATION OF APPLICATION LAYER QUALITY OF EXPERIENCE (QOE) MEASUREMENT

CROSS-REFERENCE TO RELATED APPLICATIONS

This application is a continuation of International Application No. PCT/CN2021/093092, filed on May 11, 2021, which claims priority to Chinese Patent Application No. 202010414606.5, filed on May 15, 2020, and Chinese Patent Application No. 202011127030.0, filed on Oct. 20, 2020. The disclosures of the aforementioned applications are hereby incorporated by reference in their entireties.

TECHNICAL FIELD

This application relates to the communication field, and more specifically, to a communication method and a communication apparatus.

BACKGROUND

A basic idea of a minimization of drive tests (minimization of drive-tests, MDT) technology is that an operator performs measurement through a commercial terminal device of a subscribed user, and the terminal device sends a measurement result to partially replace conventional drive tests. This can automatically collect measurement data of the terminal device, to detect and optimize a problem and a fault in a wireless network. The operator usually performs routine network coverage drive tests every month, and also performs call quality drive tests in specific areas to address user complaints. The MDT technology may be used to perform drive tests in all of these scenarios. Measurement types in the existing MDT technology may include signal level measurement, quality of service (quality of service) measurement, and accessibility measurement.

For some streaming services or voice services, such as a streaming service (streaming service) or a multimedia telephony service for an internet protocol (internet protocol, IP) multimedia system (multimedia telephony service for IMS, MTSI), pure signal quality cannot reflect experience obtained by a user when using these services. By learning about user experience, operators can better optimize networks and improve user experience. Such measurement collection may be referred to as quality of experience (quality of experience. QoE) measurement collection (QoE measurement collection, QMC), or may be referred to as application layer measurement collection.

In a QoE measurement collection solution, an access network device receives measurement configuration information of QoE measurement from a core network (core network, CN), an operation, administration and maintenance (operation, administration and maintenance, OAM), or an element manager (element manager, EM) device, and sends the measurement configuration information to a terminal device. After obtaining measurement results based on the measurement configuration information, the terminal device sends the measurement results to the access network device. The measurement configuration information is sent to the access network device in a transparent container, and the measurement results are also sent to the access network device by being encapsulated in a transparent container. In this solution, the access network device cannot perceive measurement configuration information and the measurement results. As a result, the access network device cannot use the measurement results of the terminal device in a timely manner (for example, adjust a resource configured for the terminal device to improve user experience).

SUMMARY

This application provides a communication method and a communication apparatus, so that an access network device can perceive a measurement result of QoE measurement.

According to a first aspect, a communication method is provided. The method includes:

receiving, by an access network device, first configuration information, where the first configuration information indicates a terminal device to perform application layer quality of experience QoE measurement:

generating, by the access network device, second configuration information, where the second configuration information is used by the access network device to indicate the terminal device to report measurement results of at least a part of measurement metrics obtained through the QoE measurement; and sending, by the network device, the first configuration information and the second configuration information to a terminal device.

Therefore, in this embodiment of this application, the access network device sends the second configuration information to the terminal device, so that the access network device indicates the terminal device to report the measurement results of the at least part of measurement metrics obtained when the terminal device performs the QoE measurement. In this way, the access network device can perceive a measurement result of the QoE measurement. When the access network device can perceive the QoE measurement results, the access network device can further use the measurement results of the terminal device to, for example, adjust a resource configured for the terminal device, to improve user experience.

For example, the second configuration information indicates that the measurement metrics reported by the terminal device are a subset of measurement metrics on which the terminal device performs the QoE measurement. In a specific example, when the terminal device measures five measurement metrics including an average throughput, an initial playout delay, a jitter duration, a synchronization loss duration, and an average bitrate during the QoE measurement, the second configuration information may indicate the terminal device to report measurement results of a part or all of the five measurement metrics. For example, the second configuration information may indicate the terminal device to report measurement results of two measurement metrics: the average throughput and the initial playout delay.

Optionally, the terminal device may send the first configuration information and the second configuration information to the terminal device in one message (for example, an RRC message), or may separately send the first configuration information and the second configuration information to the terminal device in different messages (for example, two different RRC messages). This is not limited in this embodiment of this application.

For example, the first configuration information may be sent to the terminal device in a container, and the second configuration information is sent to the terminal device not by being encapsulated in a container (for example, is explicitly sent to the terminal device by using an information element (information element), where specific meanings of such information elements can be known by the access network device and an RRC layer of the terminal device).

With reference to the first aspect, in some implementations of the first aspect, the second configuration information further includes a configuration of a reporting event for the measurement metrics, where the reporting event is that measurement values of the measurement metrics are higher than a first threshold or the measurement values of the measurement metrics are lower than a second threshold.

Therefore, in this embodiment of this application, the access network device sends the second configuration information to the terminal device, to indicate the terminal device to report the measurement results of the at least part of measurement metrics when the at least part of measurement metrics obtained through the QoE measurement meet the reporting event (where in this case, the measurement results are, for example, the reporting event). In this way, the access network device can perceive the measurement result of the QoE measurement.

In a possible implementation, one measurement metric may correspond to one reporting event. In another possible implementation, a plurality of measurement metrics may correspond to one reporting event. This is not limited in embodiments of this application.

Optionally, the second configuration information may further include an identifier corresponding to the reporting event, for identifying the reporting event. In this case, when reporting the reporting event, the terminal device may report the identifier of the reporting event. Correspondingly, when receiving the identifier, the access network device may determine that the measurement metrics obtained through the QoE measurement meet the reporting event corresponding to the measurement metrics.

With reference to the first aspect, in some implementations of the first aspect, the second configuration information further includes first indication information, and the first indication information indicates the terminal device to report the measurement values of the measurement metrics.

Therefore, in this embodiment of this application, the access network device sends the second configuration information to the terminal device, to indicate the terminal device to report the measurement values of the at least part of measurement metrics obtained through the QoE measurement, so that the access network device can perceive the measurement result of the QoE measurement (where in this case, the measurement result include the measurement values of the at least part of measurement metrics).

With reference to the first aspect, in some implementations of the first aspect, the second configuration information further includes a reporting period for reporting the measurement results of the at least part of measurement metrics by the terminal device. In this way, the terminal device may report, based on the reporting period indicated by the second configuration information, the measurement results of the at least part of measurement metrics obtained through the QoE measurement.

With reference to the first aspect, in some implementations of the first aspect, the access network device may further receive a first message sent by the terminal device, where the first message includes the measurement results of the at least part of measurement metrics and a measurement result obtained through the QoE measurement. In other words, the terminal device encapsulates the QoE measurement result and the measurement results of the at least part of measurement metrics obtained through the QoE measurement into a same message and reports the message to the access network device.

For example, when the reporting period indicated by the second configuration information is the same as a QoE measurement reporting period, the terminal device may encapsulate a measurement result (that is, the QoE measurement result) corresponding to the first configuration information and a measurement result (that is, the measurement results of the at least part of measurement metrics obtained through the QoE measurement) corresponding to the second configuration information in a same RRC message and send the RRC message to the access network device.

In another example, when the second configuration information does not include the reporting period for reporting the measurement results of the at least part of measurement metrics by the terminal device, in addition to reporting the QoE measurement result in a QoE measurement reporting manner, the terminal device further reports the measurement results of the at least part of measurement metrics in the QoE measurement reporting manner. In this case, the terminal device may encapsulate the measurement result (that is, the QoE measurement result) corresponding to the first configuration information and the measurement result (that is, the measurement results of the at least part of measurement metrics obtained through the QoE measurement) corresponding to the second configuration information in a same RRC message, and send the RRC message to the access network device.

When the QoE measurement result and the measurement results of the at least part of measurement metrics obtained through the QoE measurement are sent in a same RRC message, the QoE measurement result may be encapsulated in a container in the RRC message, and the measurement results of the at least part of measurement metrics may not be included in a container outside the container in the RRC message (for example, the measurement results are explicitly sent to the terminal device by using an information element (information element), where specific meanings of such information elements can be known by the access network device and an RRC layer of the terminal device).

In some optional embodiments, when the second configuration information includes the reporting event for the measurement metrics but does not include the reporting period for reporting the measurement results of the at least part of measurement metrics by the terminal device, the terminal device may report, when the at least part of measurement metrics obtained through the QoE measurement meet the reporting event, the QoE measurement result obtained through the QoE measurement (without reporting the measurement results of the at least part of measurement metrics obtained through the QoE measurement, where in this case, it may be considered that the measurement results of the at least part of measurement metrics are the QoE measurement result). Correspondingly, when receiving the QoE measurement result, the access network device can determine that the part of measurement metrics indicated in the second configuration information meet the reporting event, and further perceive the measurement result of the QoE measurement.

With reference to the first aspect, in some implementations of the first aspect, the access network device may further receive second indication information from the terminal device or a core network device, where the second indication information indicates a service type for which the terminal device prefers to perform QoE measurement, indicates that the terminal device prefers to perform QoE measurement, or indicates a measurement metric on which the terminal device prefers to perform QoE measurement.

Therefore, in this embodiment of this application, the access network device learns of, from the terminal device or the core network device, the service type for which the terminal device prefers to perform QoE measurement, whether the terminal device prefers to perform QoE measurement, or the measurement metric on which the terminal device prefers to perform QoE measurement, so that the access network device can pertinently select a terminal device to perform QoE measurement, helping reduce air interface overheads.

With reference to the first aspect, in some implementations of the first aspect, the access network device may further receive third indication information from the terminal device, where the third indication information indicates a service type for which the terminal device prefers to perform QoE measurement, indicates that the terminal device prefers to perform QoE measurement, or indicates a measurement metric on which the terminal device prefers to perform QoE measurement; and the access network device sends the third indication information to a core network device.

Therefore, in this embodiment of this application, the terminal device indicates, to the access network device, the service type for which the terminal device prefers to perform QoE measurement, whether the terminal device prefers to perform QoE measurement, or the measurement metric on which the terminal device prefers to perform QoE measurement, and then the access network device may indicate, to the core network device, the service type for which the terminal device prefers to perform QoE measurement, whether the terminal device prefers to perform QoE measurement, or the measurement metric on which the terminal device prefers to perform QoE measurement, so that a network side can pertinently select a terminal device to perform QoE measurement, helping reduce air interface overheads.

With reference to the first aspect, in some implementations of the first aspect, the generating, by the access network device, second configuration information includes: receiving, by the access network device, fourth indication information from the core network device, an operation, administration and maintenance OAM, or an element manager, where the fourth indication information indicates at least one measurement metric measured by the terminal device when the terminal device performs the QoE measurement; and generating, by the access network device, the second configuration information based on the fourth indication information.

Therefore, in this embodiment of this application, the access network device may learn of, based on the fourth indication information, application layer indicators to be measured by the terminal device during the QoE measurement. Further, the access network device may select some application layer indicators from these application layer indicators as application layer indicators that the terminal device is indicated to report in the second configuration information.

In some possible implementations, the part of measurement metrics indicated by the second configuration information may be a subset of the at least one measurement metric indicated by the fourth indication information.

In some possible implementations, the part of measurement metrics indicated by the second configuration information may be a new measurement metric obtained based on a measurement metric in a subset of the at least one measurement metric indicated by the fourth indication information. For example, the new measurement metric may be obtained based on the initial playout delay and the playout delay, for example, may be a measurement metric obtained by performing weighting based on the two measurement metrics. This is not limited in this embodiment of this application.

In some possible implementations, the second configuration information may not specify a specific measurement metric, but indicate a measurement result of a measurement metric related to a performance item.

In an example, the second configuration information may indicate to report a measurement result corresponding to a measurement metric related to a delay. In a possible case, for a streaming service, the measurement result of the delay is a measurement result of an initial playout delay and a playout delay. In another possible case, for a voice service, the measurement result of the delay is measurement results of at least two of a deterioration duration, a jitter duration, a synchronization loss duration, and a round-trip time delay.

In another example, the second configuration information may indicate to report a measurement result corresponding to a measurement metric related to a throughput. For example, the terminal device is indicated to report the measurement result of the throughput during the QoE measurement. In a possible case, for a streaming service, the measurement result of the throughput is a measurement result of an average throughput and a buffer level. In another possible case, for a voice service, the measurement result of the throughput is measurement results of a number of successively lost packets and an average codec bitrate.

With reference to the first aspect, in some implementations of the first aspect, the measurement metric includes at least one of an average throughput, an initial playout delay, a buffer level, a playout delay, a deterioration duration, a number of successively lost packets, a jitter duration, a synchronization loss duration, a round-trip time delay, an average bitrate, and a presentation delay.

According to a second aspect, a communication method is provided. The method includes:

receiving, by an access stratum of a terminal device, first configuration information from a first access network device, where the first configuration information indicates the terminal device to perform application layer quality of experience QoE measurement;

receiving, by the access stratum, second configuration information from the first access network device, where the second configuration information is used by the access network device to indicate the terminal device to report measurement results of at least a part of measurement metrics obtained through the QoE measurement;

sending, by the access stratum, first information to an upper layer of the access stratum based on the first configuration information, where the first information indicates the upper layer to perform the application layer quality of experience QoE measurement; and sending, by the access stratum, second information to the upper layer of the access stratum based on the second configuration information, where the second information indicates the upper layer to report the measurement results of the at least part of measurement metrics obtained through the QoE measurement.

With reference to the second aspect, in some implementations of the second aspect, the second configuration information further includes a configuration of a reporting event for the measurement metrics, where the reporting event is that measurement values of the measurement metrics are higher than a first threshold or the measurement values of the measurement metrics are lower than a second threshold.

With reference to the second aspect, in some implementations of the second aspect, the method further includes:

when the measurement values of the measurement metrics satisfy the reporting event, sending, by the upper layer, the measurement results of the at least part of measurement metrics to the access stratum, where the measurement results of the measurement metrics include the reporting event or a measurement result obtained through the QoE measurement; and sending, by the access stratum, the measurement results of the at least part of measurement metrics to a second access network device.

Herein, the second access network device and the first access network device may be a same device or different devices. This is not limited in this embodiment of this application.

With reference to the second aspect, in some implementations of the second aspect, the second configuration information further includes first indication information, and the first indication information indicates the terminal device to report the measurement values of the measurement metrics.

With reference to the second aspect, in some implementations of the second aspect, the second configuration information further includes a reporting period for reporting the measurement results of the at least part of measurement metrics by the terminal device.

With reference to the second aspect, in some implementations of the second aspect, the method further includes:

sending, by the terminal device, second indication information to the first access network device or a core network device, where the second indication information indicates a service type for which the terminal device prefers to perform QoE measurement, indicates that the terminal device prefers to perform QoE measurement, or indicates a measurement metric on which the terminal device prefers to perform QoE measurement.

With reference to the second aspect, in some implementations of the second aspect, the method further includes:

sending, by the upper layer, a first message to the access stratum, where the first message includes the measurement results of the at least part of measurement metrics and the measurement result obtained through the QoE measurement; and sending, by the access stratum, the first message to a third access network device.

Herein, the third access network device and the first access network device may be a same device or different devices. This is not limited in this embodiment of this application.

With reference to the second aspect, in some implementations of the second aspect, the measurement metric includes at least one of an average throughput, an initial playout delay, a buffer level, a playout delay, a deterioration duration, a number of successively lost packets, a jitter duration, a synchronization loss duration, a round-trip time delay, an average bitrate, and a presentation delay.

According to a third aspect, an embodiment of this application provides a communication apparatus, configured to perform the method according to any one of the first aspect or the possible implementations of the first aspect. Specifically, the apparatus includes units or modules configured to perform the method according to any one of the first aspect or the possible implementations of the first aspect, for example, a transceiver unit and a processing unit.

The transceiver unit is configured to receive first configuration information, where the first configuration information indicates a terminal device to perform application layer quality of experience QoE measurement.

The processing unit is configured to generate second configuration information, where the second configuration information is used by the access network device to indicate the terminal device to report measurement results of at least a part of measurement metrics obtained through the QoE measurement.

The transceiver unit is further configured to send the first configuration information and the second configuration information to a terminal device.

With reference to the third aspect, in some implementations of the third aspect, the second configuration information further includes a configuration of a reporting event for the measurement metrics, where the reporting event is that measurement values of the measurement metrics are higher than a first threshold or the measurement values of the measurement metrics are lower than a second threshold.

With reference to the third aspect, in some implementations of the third aspect, the second configuration information further includes first indication information, and the first indication information indicates the terminal device to report the measurement values of the measurement metrics.

With reference to the third aspect, in some implementations of the third aspect, the second configuration information further includes a reporting period for reporting the measurement results of the at least part of measurement metrics by the terminal device.

With reference to the third aspect, in some implementations of the third aspect, the transceiver unit is further configured to receive second indication information from the terminal device or a core network device, where the second indication information indicates a service type for which the terminal device prefers to perform QoE measurement, indicates that the terminal device prefers to perform QoE measurement, or indicates a measurement metric on which the terminal device prefers to perform QoE measurement.

With reference to the third aspect, in some implementations of the third aspect, the transceiver unit is further configured to receive third indication information from the terminal device, where the third indication information indicates a service type for which the terminal device prefers to perform QoE measurement, indicates that the terminal device prefers to perform QoE measurement, or indicates a measurement metric on which the terminal device prefers to perform QoE measurement.

The transceiver unit is further configured to send the third indication information to a core network device.

With reference to the third aspect, in some implementations of the third aspect, the transceiver unit is further configured to receive fourth indication information from the core network device, an operation, administration and maintenance OAM, or an element manager, where the fourth indication information indicates at least one measurement metric measured by the terminal device when the terminal device performs the QoE measurement.

The processing unit is specifically configured to generate the second configuration information based on the fourth indication information.

With reference to the third aspect, in some implementations of the third aspect, the transceiver unit is further configured to receive the measurement results of the at least part of measurement metrics from the terminal device, where the measurement results of the measurement metrics include at least one of the reporting event, the measurement values of the measurement metrics, or a measurement result obtained through the QoE measurement.

The transceiver unit is further configured to receive a first message sent by the terminal device, where the first message includes the measurement results of the at least part of measurement metrics and the measurement result obtained through the QoE measurement.

With reference to the third aspect, in some implementations of the third aspect, the measurement metric includes at least one of an average throughput, an initial playout delay, a buffer level, a playout delay, a deterioration duration, a number of successively lost packets, a jitter duration, a synchronization loss duration, a round-trip time delay, an average bitrate, and a presentation delay.

According to a fourth aspect, an embodiment of this application provides a communication apparatus, configured to perform the method according to any one of the second aspect or the possible implementations of the second aspect. Specifically, the apparatus includes units or modules configured to perform the method according to any one of the second aspect or the possible implementations of the second aspect, for example, a transceiver unit and a processing unit.

The transceiver unit is configured to receive, by an access stratum, first configuration information from a first access network device, where the first configuration information indicates the terminal device to perform application layer quality of experience QoE measurement.

The transceiver unit is further configured to receive, by the access stratum, second configuration information from the first access network device, where the second configuration information is used by the access network device to indicate the terminal device to report measurement results of at least a part of measurement metrics obtained through the QoE measurement.

The processing unit is configured to send, by the access stratum, first information to an upper layer of the access stratum based on the first configuration information, where the first information indicates the upper layer to perform the application layer quality of experience QoE measurement.

The processing unit is further configured to send, by the access stratum, second information to the upper layer of the access stratum based on the second configuration information, where the second information indicates the upper layer to report the measurement results of the at least part of measurement metrics obtained through the QoE measurement.

With reference to the fourth aspect, in some implementations of the fourth aspect, the second configuration information further includes a configuration of a reporting event for the measurement metrics, where the reporting event is that measurement values of the measurement metrics are higher than a first threshold or the measurement values of the measurement metrics are lower than a second threshold.

With reference to the fourth aspect, in some implementations of the fourth aspect, when the measurement values of the measurement metrics satisfy the reporting event, the processing unit is further configured to send, by the upper layer, the measurement results of the at least part of measurement metrics to the access stratum, where the measurement results of the measurement metrics include the reporting event or a measurement result obtained through the QoE measurement.

The transceiver unit is further configured to send, by the access stratum, the measurement results of the at least part of measurement metrics to a second access network device.

With reference to the fourth aspect, in some implementations of the fourth aspect, the second configuration information further includes first indication information, and the first indication information indicates the terminal device to report the measurement values of the measurement metrics.

With reference to the fourth aspect, in some implementations of the fourth aspect, the second configuration information further includes a reporting period for reporting the measurement results of the at least part of measurement metrics by the terminal device.

With reference to the fourth aspect, in some implementations of the fourth aspect, the transceiver unit is further configured to send second indication information to the first access network device or a core network device, where the second indication information indicates a service type for which the terminal device prefers to perform QoE measurement, indicates that the terminal device prefers to perform QoE measurement, or indicates a measurement metric on which the terminal device prefers to perform QoE measurement.

With reference to the fourth aspect, in some implementations of the fourth aspect, the processing unit is further configured to send, by the upper layer, a first message to the access stratum, where the first message includes the measurement results of the at least part of measurement metrics and the measurement result obtained through the QoE measurement.

The transceiver unit is further configured to send, by the access stratum, the first message to a third access network device.

With reference to the fourth aspect, in some implementations of the fourth aspect, the measurement metric includes at least one of an average throughput, an initial playout delay, a buffer level, a playout delay, a deterioration duration, a number of successively lost packets, a jitter duration, a synchronization loss duration, a round-trip time delay, an average bitrate, and a presentation delay.

According to a fifth aspect, an embodiment of this application provides a communication apparatus, and the apparatus includes a processor and a transceiver. Optionally, the apparatus may further include a memory. The memory is configured to store instructions, the processor is configured to execute the instructions stored in the memory; and when the processor executes the instructions stored in the memory, the execution enables the processor to perform the method according to any one of the first aspect or the possible implementations of the first aspect, or perform the method according to any one of the second aspect or the possible implementations of the second aspect.

According to a sixth aspect, an embodiment of this application provides a computer-readable medium, configured to store a computer program. The computer program includes instructions for performing the method according to any one of the first aspect or the possible implementations of the first aspect or the method according to any one of the second aspect or the possible implementations of the second aspect.

According to a seventh aspect, a computer program product including instructions is provided. When the computer program product runs on a computer, the computer is enabled to perform the method according to any one of the first aspect or the possible implementations of the first aspect or the method according to any one of the second aspect or the possible implementations of the second aspect.

According to an eighth aspect, a chip is provided, and includes a processor and a communication interface, where the processor is configured to invoke instructions from the communication interface and run the instructions. When executing the instructions, the processor implements the method according to any one of the first aspect or the possible implementations of the first aspect or the method according to any one of the second aspect or the possible implementations of the second aspect.

Optionally, the chip may further include a memory. The memory stores instructions. The processor is configured to execute the instructions stored in the memory or other instructions. When the instructions are executed, the processor is configured to implement the method according to any one of the first aspect or the possible implementations of the first aspect or the method according to any one of the second aspect or the possible implementations of the second aspect.

According to a ninth aspect, a communication system is provided. The communication system includes an apparatus with functions for implementing the method and the possible designs in the first aspect, and an apparatus with functions for implementing the method and the possible designs in the second aspect.

It should be understood that for beneficial effects achieved in the second to the ninth aspects and the corresponding implementations of this application, refer to beneficial effects achieved in the first aspect and the corresponding implementations of this application. Details are not described again.

DESCRIPTION OF EMBODIMENTS

Figure 1:
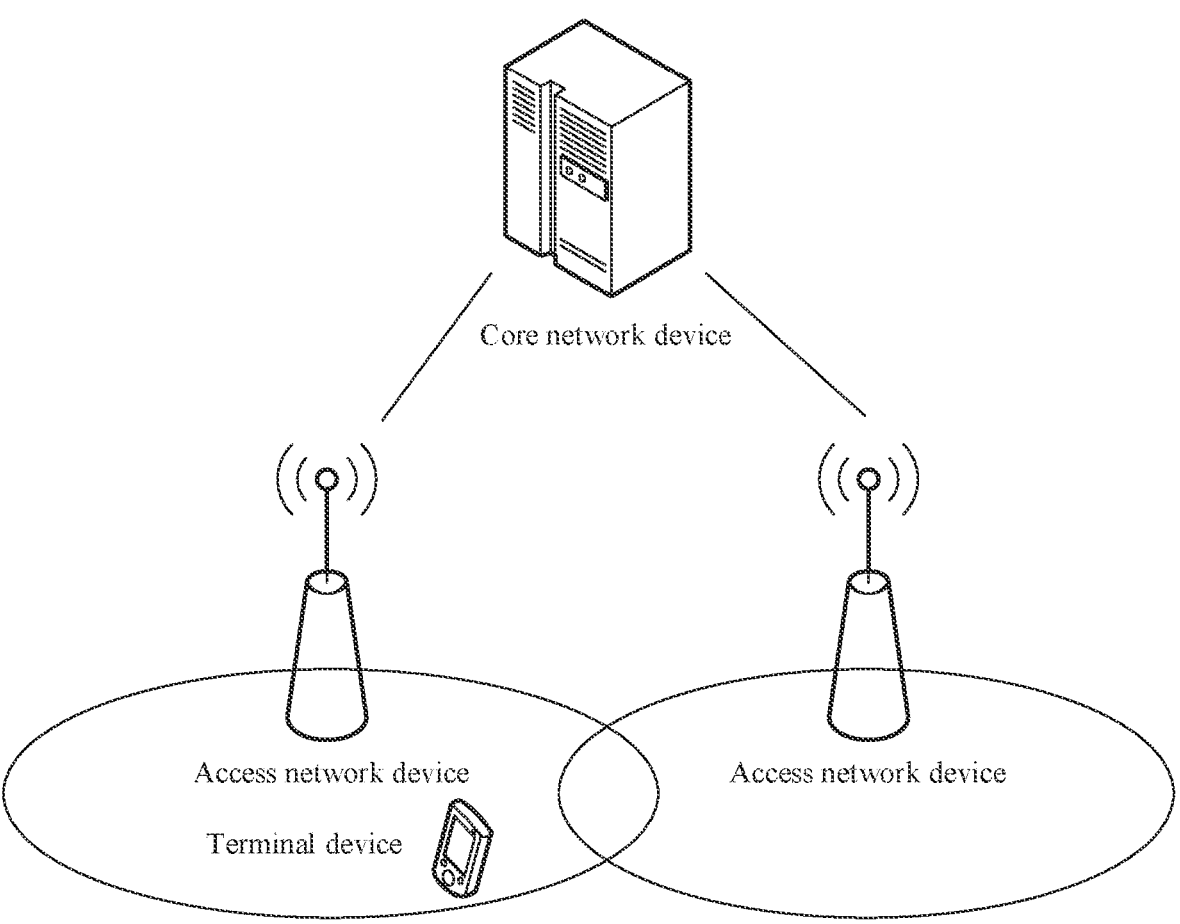
FIG. 1 is a schematic diagram of a structure of a communication system according to this application.

The following describes technical solutions of this application with reference to accompanying drawings.

The technical solutions in embodiments of this application may be used in various communication systems, for example, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a 5th generation (5th generation, 5G) system, new radio (new radio, NR), or a future next-generation communication system.

A terminal device in embodiments of this application may also be referred to as user equipment (user equipment, UE), a mobile station (mobile station, MS), a mobile terminal (mobile terminal, MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some examples of the terminal are a mobile phone (mobile phone), a tablet computer, a laptop computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5G network, a terminal device in a future evolved public land mobile network (public land mobile network, PLMN), or the like. This is not limited in embodiments of this application.

By way of example rather than limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the terminal device in embodiments of this application may alternatively be a terminal device in an internet of things (internet of things, IoT) system. IoT is an important part of future information technology development. A main technical feature of the IoT is connecting things to a network by using communication technologies, to implement an intelligent network for interconnection between persons and machines, and between things.

In embodiments of this application, an IoT technology may implement massive connections, deep coverage, and terminal power saving by using, for example, a narrow band (narrow band, NB) technology. For example, the NB includes only one resource block (resource block, RB). In other words, a bandwidth of the NB is only 180 KB. To implement massive access, terminals need to be discrete in access. According to a communication method in embodiments of this application, a congestion problem that occurs in the IoT technology when massive terminals access a network by using the NB can be effectively resolved.

An access network device in embodiments of this application may be a device configured to communicate with the terminal device. The access network device may also be referred to as an access device or a radio access network device, and may be a base transceiver station (base transceiver station, BTS) in a global system for mobile communications (global system for mobile communications, GSM) system or a code division multiple access (code division multiple access, CDMA) system, a NodeB (NodeB, NB) in a wideband code division multiple access (wideband code division multiple access, WCDMA) system, an evolved NodeB (evolved NodeB, eNB or eNodeB) in an LTE system, or a radio controller in a cloud radio access network (cloud radio access network, CRAN) scenario. Alternatively, the access network device may be a relay station, an access point, a vehicle-mounted device, a wearable device, an access network device in a 5G network, an access network device in a future evolved PLMN network, or the like, or may be an access point (access point, AP) in a WLAN, or a gNB in a new radio (new radio, NR) system. This is not limited in embodiments of this application.

In addition, in embodiments of this application, the access network device is a device in a RAN, that is, is a RAN node that connects the terminal device to a wireless network. For example, by way of example rather than limitation, the access network device may be a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a wireless fidelity (wireless fidelity, Wi-Fi) access point (access point, AP), or the like. In a network structure, the network device may include a central unit (centralized unit, CU) node, a distributed unit (distributed unit, DU) node, a RAN device including a CU node and a DU node, or a RAN device including a control plane CU node (CU-CP node), a user plane CU node (CU-UP node), and a DU node.

The access network device provides services for a cell. The terminal device communicates with the access network device by using a transmission resource (for example, a frequency domain resource, or in other words, a spectrum resource) used for the cell. The cell may be a cell corresponding to the access network device (for example, a base station), and the cell may belong to a macro base station, or may belong to a base station corresponding to a small cell (small cell). The small cell herein may include a metro cell (metro cell), a micro cell (micro cell), a pico cell (pico cell), a femto cell (femto cell), and the like. These small cells have features of small coverage and low transmit power, and are suitable for providing a high-rate data transmission service.

In addition, a plurality of cells may simultaneously work in a same frequency band on a carrier in the LTE system or the 5G system. In some special scenarios, it may be considered that a concept of the carrier is equivalent to that of the cell. For example, in a carrier aggregation (carrier aggregation, CA) scenario, both a carrier index of a secondary component carrier and a cell identifier (cell identification, Cell ID) of a secondary cell that works on the secondary component carrier are carried when the secondary component carrier is configured for UE. In this case, it may be considered that the concept of the carrier is equivalent to that of the cell. For example, that the terminal device accesses a carrier is equivalent to that the terminal device accesses a cell.

In embodiments of this application, a core network device may be a device in a core network (core network, CN) that provides service support for the terminal device. Currently, some examples of the core network device are an access and mobility management function (access and mobility management function, AMF) entity, a session management function (session management function, SMF) entity, a user plane function (user plane function. UPF) entity, and the like, which are not listed one by one herein. The AMF entity may be responsible for access management and mobility management of the terminal. The SMF entity may be responsible for session management, for example, user session establishment. The UPF entity may be a user-plane function entity, and is mainly responsible for a connection to an external network.

It should be noted that an entity in this application may also be referred to as a network element or a function entity. For example, the AMF entity may also be referred to as an AMF network element or an AMF function entity. For another example, the SMF entity may also be referred to as an SMF network element or an SMF function entity.

FIG. 1 is a schematic diagram of a network architecture according to an embodiment of this application. As shown in FIG. 1, a terminal device may have communication connections to two access network devices simultaneously and may receive and send data. The communication connections may be referred to as dual connectivity (dual-connectivity, DC) or multi-radio (multi-radio) dual connectivity (multi-radio dual connectivity, MR-DC). In this way, a network side may provide a communication service for the terminal device by using resources of the two access network devices, to provide high-rate transmission for the terminal device. One of the two access network devices may be responsible for exchanging a radio resource control message with the terminal device, and is responsible for interacting with a core network control plane entity. In this case, the access network device may be referred to as a master node (master node, MN), and the other radio access network device may be referred to as a secondary node (secondary node, SN).

Similarly, the terminal device may alternatively have communication connections to a plurality of access network devices simultaneously and may receive and send data. The communication connections may be referred to as multi-connectivity (multi-connectivity, MC). In the plurality of access network devices, one access network device may be responsible for exchanging a radio resource control message with the terminal device, and is responsible for interacting with a core network control plane entity. In this case, the access network device may be referred to as an MN, and remaining access network devices may be referred to as SNs.

In this application, the access network device may be an eNB in an LTE standard, a gNB in an NR standard, a master node (master node, MN) in a dual-connectivity architecture, a secondary node in a dual-connectivity architecture, an MN in a multi-connectivity architecture, or an SN in a multi-connectivity architecture.

Figure 2:
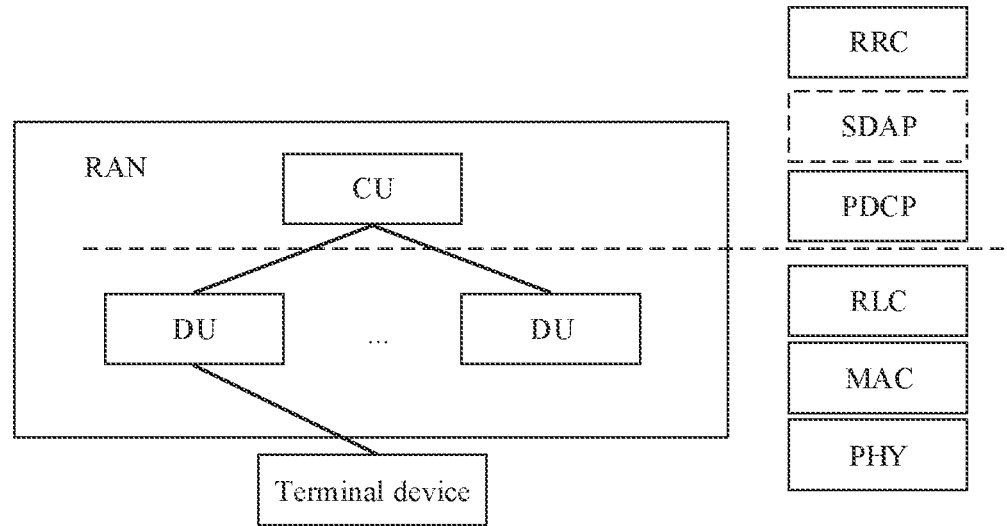
FIG. 2 is a schematic diagram of a structure of an access network device according to this application.

FIG. 2 is a schematic diagram of a network architecture according to an embodiment of this application. As shown in FIG. 2, communication between a RAN device and a terminal device complies with a specific protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure may include functions of protocol layers such as a PDCP layer, an RLC layer, a MAC layer, and a physical layer. In an implementation, a service data adaptation protocol (service data adaptation protocol, SDAP) layer is further included above the PDCP layer.

The functions of these protocol layers may be implemented by using one node, or may be implemented by using a plurality of nodes. For example, in an evolved structure, the RAN device may include a centralized (centralized unit, CU) and a distributed unit (distributed unit, DU), and a plurality of DUs may be controlled by one CU in a centralized manner.

As shown in FIG. 2, the CU and the DU may be divided based on a protocol layer of a wireless network. For example, functions of the PDCP layer and a layer above the PDCP layer are set in the CU, and functions of protocol layers below the PDCP layer, such as the RLC layer and the MAC layer, are set in the DU. In other words, the CU has functions of layers (including the PDCP layer, an RRC layer, and an SDAP layer) above the PDCP layer, and the DU has functions of layers (including the RLC layer, the MAC layer, and a PHY layer) below the PDCP layer.

Division based on the protocol layer is merely an example, and division may alternatively be performed based on another protocol layer such as the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU.

Figure 3:
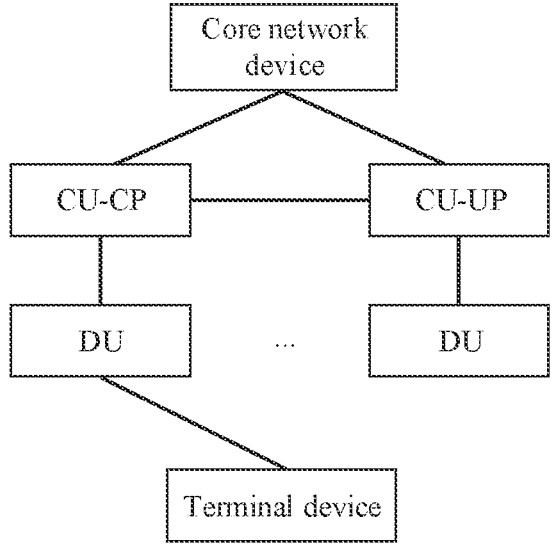
FIG. 3 is another schematic diagram of a structure of an access network device according to this application.

FIG. 3 is another schematic diagram of a network architecture to which an embodiment of this application is applicable. Compared with that in the architecture shown in FIG. 2, a control plane (CP) and a user plane (UP) of a CU may be separated and implemented by using different entities. The different entities are respectively a control plane CU entity (CU-CP entity) and a user plane CU entity (CU-UP entity).

In the foregoing network architecture, signaling generated by the CU may be sent to a terminal device through a DU, or signaling generated by a terminal device may be sent to the CU through a DU. The DU may transparently transmit the signaling to the terminal device or the CU by directly encapsulating the signaling at a protocol layer without parsing the signaling. In the following embodiments, if transmission of such signaling between the DU and the terminal device is involved, sending or receiving of the signaling by the DU includes this scenario. For example, signaling of an RRC layer or a PDCP layer is finally processed as signaling of a PHY layer and sent to the terminal device, or signaling of an RRC layer or a PDCP layer is converted from received signaling of a PHY layer. In this architecture, the signaling at the RRC layer or the PDCP layer may also be considered as being sent by the DU, or sent by the DU and the radio frequency.

In the foregoing embodiment, the CU is classified into a network device on a RAN side. In addition, the CU may be alternatively classified into a network device on a CN side. This is not limited herein.

An apparatus in the following embodiments of this application may be located in a terminal device or a network device based on a function implemented by the apparatus. When the foregoing CU-DU structure is used, the network device may be a CU node, a DU node, or a RAN device including a CU node and a DU node.

It should be understood that the foregoing FIG. 1 to FIG. 3 are merely an example for description, but shall not constitute any limitation on this application. For example, in a communication system, a core network device may be connected to a plurality of access network devices, configured to control the access network devices, and can distribute data received from a network side (for example, the Internet) to the access network devices.

In embodiments of this application, the terminal device or the access network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry instructions and/or data.

The following describes a minimization of drive tests (minimization of drive-tests. MDT) technology.

A basic idea of the MDT technology is that an operator performs measurement through a commercial terminal device of a subscribed user, and the terminal device sends a measurement result to partially replace conventional drive tests. This can automatically collect measurement data of the terminal device, to detect and optimize a problem and a fault in a wireless network. Measurement types of the existing MDT technology may be classified into the following three types:

1. Signal level measurement: A terminal device measures a signal level of a radio signal, and sends a measurement result to an access network device or an access network device controller.
2. Quality of service (quality of service, QoS) measurement: Generally, an access network device performs QoS measurement (for example, on service traffic, a service throughput, or a service delay). Alternatively, a terminal device may perform measurement on, for example, an uplink processing delay. Alternatively, an access network device and a terminal device may perform joint processing, for example, air interface delay measurement (measuring time from a moment at which a data packet passes through an SDAP/PDCP layer of the access network device to a moment at which the data packet arrives at a DAP/PDCP layer of the terminal device).
3. Accessibility measurement: A terminal device records information about a radio resource control (radio resource control, RRC) connection setup failure or an RRC resume (resume) failure, and sends the information to an access network device or an access network device controller.

The MDT includes logged (logged) MDT and immediate (immediate) MDT. The immediate MDT is mainly for measuring a terminal device in an RRC connected mode (RRC_CONNECTED), and the logged MDT is mainly for measuring a terminal device in an idle mode (RRC_IDLE) or a terminal device in an RRC inactive mode (RRC_INACTIVE). For example, the terminal device in the idle mode or the terminal device in the inactive mode may record a cell on which the terminal device currently camps, another neighboring cell of a frequency corresponding to the cell on which the terminal device currently camps, and a received signal strength measurement result in an inter-frequency/inter-system neighboring cell corresponding to cell reselection broadcast in the cell on which the terminal device currently camps. The immediate MDT is generally for measuring a data amount, an IP throughput, a packet transmission delay, a packet loss rate, a processing delay, and the like of the terminal device, and also includes measurement performed by the terminal device on a reference signal of a current serving cell or another neighboring cell.

In radio, some layer 2 (layer 2, L2) measurements are further defined for some network performance statistics on a network side, to perform functions such as radio link management, radio resource management, and network maintenance. The L2 measurements are performed for statistics for one terminal device, for example, a service throughput, service traffic, a processing delay of the terminal device, and an air interface delay of the terminal device.

The access network device may initiate two types of MDT measurement collection tasks. One is to initiate signaling based trace to perform MDT, which is also referred to as signaling based MDT (signaling based MDT). The other is to initiate management based trace to perform MDT, which is also referred to as management based MDT (management based MDT).

The signaling based MDT means that for a specific terminal device, and the access network device receives, from a CN, a message indicating to perform MDT for the terminal device. The management based MDT is not MDT for a specific terminal device, and the access network device receives, from an OAM or an EM, a message for performing MDT. For example, the access network device may select, based on a specific policy from terminal devices served by the access network device, a terminal device to perform MDT measurement.

For the signaling based MDT, the CN does not initiate signaling based MDT for the terminal device unless a user has agreed to perform MDT. For the management based MDT, when selecting a terminal device, the access network device may consider whether the terminal device agrees to perform MDT. For example, the access network device selects only those terminal devices that have agreed to perform MDT, to perform MDT measurement. For example, the CN may notify the access network device whether a terminal device agrees to perform MDT.

The two foregoing types of MDT each may include logged MDT and immediate MDT. For example, for the signaling based MDT, the CN notifies the access network device of some MDT configuration information and an IP address of a trace collection entity (trace collection entity, TCE). The MDT configuration information includes an MDT activation type (for example, Immediate MDT only, logged MDT only, or Immediate MDT and Trace), an MDT area scope, an MDT mode and a corresponding mode configuration parameter (for example, a measurement event of immediate MDT, and a recording interval and a duration of logged MDT), a PLMN list of the signaling based MDT, and the like.

For some streaming services or voice services, such as a streaming service or an IP MTSI service, pure signal quality cannot reflect user experience obtained by a user when using these services. In this case, the operator may learn of user experience through QoE measurement collection, to better optimize a network to improve user experience.

The QoE measurement may alternatively be initiated based on trace from a signaling based MDT framework or trace from a management based MDT framework. The access network device receives QoE measurement configuration information from the CN, the OAM, or the EM, and then may send the configuration information to the terminal device in an RRC message. After receiving, from an upper layer of the terminal device, measurement results obtained through QoE measurement at an application layer, an RRC layer of the terminal device may send the measurement results to the access network device.

In an existing solution, the QoE measurement configuration information is sent to the access network device in a transparent container Correspondingly, the measurement results obtained by the terminal device through the QoE measurement are also sent to the access network device by being encapsulated in a transparent container. In this case, the access network device cannot perceive the measurement configuration information and the measurement results. As a result, the access network device cannot use the measurement results of the terminal device in a timely manner (for example, adjust a resource configured for the terminal device to improve user experience). In this embodiment of this application, for the container sent by a network management system or the core network to the terminal device, a base station may not parse content in the container (even if the base station is capable of parsing), but directly forwards the container to the terminal device. It may be considered that the container is transparent to the base station.

In view of this, embodiments of this application provide a communication method. In this solution, an access network device may indicate a terminal device to report measurement results of at least a part of measurement metrics obtained by the terminal device through QoE measurement. In this way, the access network device can perceive a measurement result of the QoE measurement. Therefore, the access network device can use the measurement results of the terminal device in a timely manner (for example, adjust a resource configured for the terminal device to improve user experience).

The following describes in detail a communication method and a communication apparatus provided in this application with reference to the accompanying drawings.

The technical solutions of this application may be applied to a wireless communication system, for example, the communication system shown in FIG. 1, the communication system shown in FIG. 2, or the communication system shown in FIG. 3. There may be a wireless communication connection relationship between communication apparatuses in the wireless communication system. One of the communication apparatuses may be, for example, an access network device or a chip disposed in the access network device, and another apparatus may be, for example, a terminal device or a chip disposed in the terminal device. This is not limited in embodiments of this application.

Without loss of generality, embodiments of this application are first described in detail by using a communication process of a terminal device as an example. It may be understood that any terminal device in the wireless communication system or a chip disposed in the terminal device may perform communication using the same method, and any access network device in the wireless communication system or a chip disposed in the access network device may perform communication using the same method. This is not limited in this application.

Figure 4:
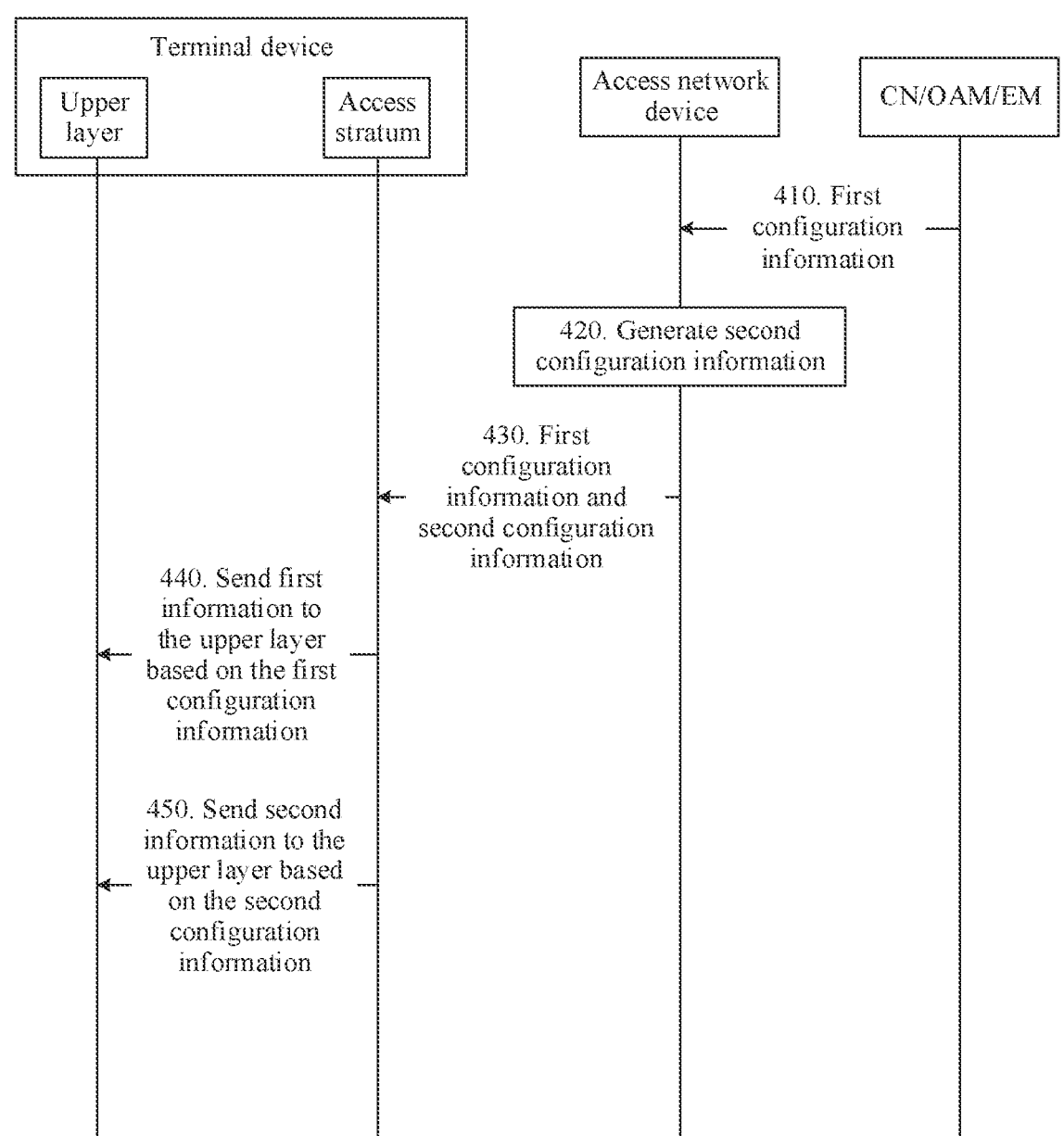
FIG. 4 is a schematic flowchart of a communication method according to an embodiment of this application.

FIG. 4 is a schematic flowchart of a communication method 400 according to an embodiment of this application. As shown in FIG. 4, the method 400 includes steps 410 to 450.

410. A CN/OAM/EM sends first configuration information to an access network device. Correspondingly, the access network device receives the first configuration information. The first configuration information indicates a terminal device to perform application layer QoE measurement, for example, indicates the terminal device to start application layer QoE measurement.

In some embodiments, the first configuration information may be included in QoE measurement configuration information sent by the CN/OAM/EM to the access network device. The QoE measurement configuration information is QoE measurement-related configuration information sent by the CN/OAM/EM to the access network device, that is, QoE measurement-related configuration information that is indicated by the CN/OAM/EM to the terminal device.

In some embodiments, when the QoE measurement is initiated through signaling based MDT, that is, the QoE measurement is signaling based QoE measurement, the CN sends the QoE measurement configuration information. Correspondingly, the access network device receives the QoE measurement configuration information from the CN. In a possible implementation, the CN may notify the QoE measurement configuration information for a specific terminal device. For example, the QoE measurement configuration information may be sent in an interface message that is between the access network device and the CN and that is for the specific terminal device. For example, an initial uplink/downlink setup message (initial context setup message), a trace start message (trace start message), or a handover request message (handover request message) sent by the CN to the access network device for the specific terminal device carry the QoE measurement configuration information.

In some embodiments, when the QoE measurement is initiated through management based MDT, that is, the QoE measurement is management based measurement, the OAM or the EM sends the QoE measurement configuration information. Correspondingly, the access network device receives the QoE measurement configuration information from the OAM or the EM. It should be noted that the QoE measurement configuration information herein is not QoE measurement configuration information for a specific terminal device.

In some embodiments, that the CN/OAM/EM sends the first configuration information to the access network device includes: The CN/OAM/EM sends the first configuration information to the access network device; the CN/OAM/EM sends the first configuration information to a master node in DC, and then the master node sends the first configuration information to a secondary node (where in this case, the access network device is the secondary node); or the CN/OAM/EM sends the first configuration information to an access network device, where in a handover scenario, the access network device serves as a source base station to send the first configuration information to a target base station, and in this case, the target base station serves as the access network device in this step.

In an example, the QoE measurement configuration information may be shown in the following Table 1:

TABLE 1

| IE/group name (IE/group name) | Presence (presence) | Range (range) | IE type and reference (IE type and reference) | Semantics description (semantics description) | Criticality (criticality) | Assigned criticality (assigned criticality) |
|---|---|---|---|---|---|---|
| Application-layer measurement | Mandatory Mandatory (M) | | Octet string Octet string (1 . . . 1000) | Indicates an application layer | — | — |

TABLE 1-continued

| IE/group name (IE/group name) | Presence (presence) | Range (range) | IE type and reference (IE type and reference) | Semantics description (semantics description) | Criticality (criticality) | Assigned criticality (assigned criticality) |
|---|---|---|---|---|---|---|
| configuration container | | | | measurement configuration; refer to Annex L in [43]. | | |
| QoE measurement collection area scope choice (CHOICE Area Scope of QMC) | M | | | | — | — |
| >Cell-based (Cell based) | | | | | | — |
| >>Cell list for QMC (Cell ID List for QMC) | | 1 . . . <maxnoofCellIDforQMC> | | | | — |
| >>>Cell global identifier (cell global identifier, CGI) | M | | Public land mobile network (public land mobile network, PLMN) identifier and cell identifier | | — | — |
| Tracking area based (Tracking area based, TA-based) | | | | | | — |
| >>Tracking area list for QMC (TA List for QMC) | | 1 . . . <maxnoofTAforQMC> | | | | — |
| >>>Tracking area code (Tracking Area Code, TAC) | M | | Octet string Octet string (2) | | — | — |
| >Tracking area identity based (TAI based) | | | | | — | — |
| >>Tracking area identity list for QMC (TAI List for QMC) | | 1 . . . <maxnoofTAforQMC> | | | — | — |
| >>>Tracking area identity (TAI) | M | | PLMN and tracking area code | | — | — |
| >PLMN area based (PLMN area based) | | | | | | — |
| >>PLMN list for QMC (PLMN List for QMC) | | 1 . . . <maxnoofPLMNforQMC> | | | | — |
| >>>PLMN identity (PLMN Identity) | M | | Octet string Octet string (3) | | — | — |
| Service type (Service Type) | M | | Enumerated types (QMC for streaming service (QMC for streaming service) and QMC for MTSI service (QMC for MTSI service)) | | — | — |

In Table 1, the QoE measurement configuration information includes a container (container), and the container includes the first configuration information (which may also be referred to as application layer measurement configuration information). In other words, the first configuration information is measurement configuration information in the container in the QoE measurement configuration information.

For example, the first configuration information may indicate that an application layer of the terminal device is performing QoE measurement. In an example, the terminal device may measure at least one of the following measurement metrics (which may also be referred to as application layer indicators) based on the first configuration information:

Average throughput: This indicator indicates a total number of bits received by the application layer of the terminal device within a measurement interval. For example, for a streaming service, this indicator refers to a total number of bits of streaming received by the application layer of the terminal device. For details, refer to a definition in section 10.2 in the 3GPP protocol TS 26.247. Details are not described herein.

Initial playout delay: This indicator indicates an initial playout delay when streaming starts to be displayed. For example, this indicator may be defined as time from a moment at which the first segment of streaming is obtained to a moment at which the streaming is extracted from a buffer of a client. For details, refer to a definition in section 10.2 in the 3GPP protocol TS 26.247. Details are not described herein.

Buffer level: This indicator indicates a duration in which media data can be played from a current playout moment. For details, refer to a definition in section 10.2 in the 3GPP protocol TS 26.247. Details are not described herein.

Playout delay: This indicator indicates a playout delay in streaming start. For example, this indicator may be defined as a delay from a moment at which a dynamic adaptive streaming over hypertext transfer protocol (dynamic adaptive streaming over HTTP, DASH) player receives a playout/back/start trigger to a moment of media playout. For details, refer to a definition in section 10.2 in the 3GPP protocol TS 26.247. Details are not described herein.

Deterioration duration: This indicator indicates an interval between Nepal time (nepal time, NPT) corresponding to a good-quality frame exactly before deterioration and Nepal time corresponding to the subsequent first good-quality frame. The good-quality frame is a frame that is completely accepted, and all parts of a picture corresponding to the frame include correct content or the frame is a new frame (that is, does not depend on any previously decoded frame) or depends only on a previously decoded good-quality frame. For details, refer to a definition in section 16.2 in the 3GPP protocol TS 26.114. Details are not described herein.

Number of successively lost packets: This indicator indicates a number of successively lost real-time transport protocol (real-time transport protocol, RTP) packets. For details, refer to a definition in section 16.2 in the 3GPP protocol TS 26.114. Details are not described herein.

Jitter duration: Jitter indicates that a difference between an actual playout moment and a wanted playout moment of a frame exceeds a threshold. A wanted playout moment of a frame is a playout moment of the previous playout frame plus a difference between Nepal time of the current frame and Nepal time of a previous frame. For details, refer to a definition in section 16.2 in the 3GPP protocol TS 26.114. Details are not described herein.

Synchronization loss duration: Out-of-synchronization indicates that an absolute time difference between a value A and a value B exceeds a specific threshold. The value A herein refers to a difference between a playout moment of a previous playout frame of a video stream and a playout moment of a previous playout frame of a voice stream. The value B herein refers to a difference between a wanted playout moment of the previous playout frame of the video stream and a wanted playout moment of the previous playout frame of the voice stream. For details, refer to a definition in section 16.2 in the 3GPP protocol TS 26.114. Details are not described herein.

Round-trip time delay: This indicator indicates RTP-level round-trip time, plus an additional two-way delay (RTP level→loudspeaker→microphone→RTP level) due to buffering and other processing at the client. For details, refer to a definition in section 16.2 in the 3GPP protocol TS 26.114. Details are not described herein.

Average bitrate: This indicator indicates a bitrate at which codec media information is valid in a measurement period. For details, refer to a definition in section 16.2 in the 3GPP protocol TS 26.114. Details are not described herein.

Presentation (presentation) delay: This indicator is defined as a delay between a wanted (wanted) presentation moment of a DASH segment and an actual presentation moment of the segment.

Comparable quality viewpoint switching latency (comparable quality viewpoint switching latency): This indicator reflects a latency and quality-related factors when quality deteriorates due to viewpoint switching. Correspondingly, the delay may be understood as a delay from quality deterioration caused by viewpoint switching to quality restoration to a degree equivalent to quality before the viewpoint switching.

It should be noted that, because the first configuration information is included in the container, the access network device cannot perceive specific configuration content in the first configuration information.

In some embodiments, the first configuration information may include configurations of the foregoing measurement metrics. In this case, when obtaining the first configuration information, the terminal device may perform QoE measurement based on the measurement metrics indicated by the first configuration information, to obtain measurement results of the measurement metrics indicated by the first configuration information.

In some other embodiments, the first configuration information may not include configurations of the foregoing measurement metrics. In some possible implementations, when the first configuration information does not include the configurations of the measurement metrics, the terminal device may perform QoE measurement based on pre-obtained measurement metrics, to obtain measurement results of the pre-obtained measurement metrics.

It should be understood that "pre-obtained" herein may be indicated by signaling of a network device or predefined, for example, defined in a protocol. Herein. "predefined" may be implemented in a manner in which corresponding code, a table, or other related indication information is prestored in a device (for example, including a terminal device and a network device). A specific implementation thereof is not limited in this application.

As shown in Table 1, in addition to the first configuration information, the QoE measurement configuration information received by the access network device from the CN/OAM/EM may further include other information related to the QoE measurement, for example, an area scope for the QoE measurement and a service type for the QoE measurement. This is not limited in this embodiment of this application.

It should be noted that, in this embodiment of this application, an example in which the access network device receives the first configuration information from the CN/OAM/EM is used for description. This embodiment of this application is not limited thereto. For example, the access network device may alternatively receive the first configuration information from another network side device.

420. The access network device generates second configuration information, where the second configuration information is used by the access network device to indicate the terminal device to report measurement results of at least a part of measurement metrics obtained through the QoE measurement.

For example, the terminal device may perform the QoE measurement based on the first configuration information. When performing the QoE measurement, the terminal device may measure at least one measurement metric based on the first configuration information or the pre-obtained prediction metrics, and obtain a measurement result of the at least one measurement metric. In this embodiment of this application, the measurement result that is of the at least one measurement metric and that is obtained by the terminal device through the QoE measurement may be referred to as a QoE measurement result. For example, the measurement result of the at least one measurement metric may be a measurement value of the at least one measurement metric. This is not limited in this embodiment of this application.

Herein, the at least one measurement metric is, for example, at least one of an average throughput, an initial playout delay, a buffer level, a playout delay, a deterioration duration, a number of successively lost packets, a jitter duration, a synchronization loss duration, a round-trip time delay, an average bitrate, and a comparable quality viewpoint switching latency.

Correspondingly, the second configuration information may be used by the access network device to indicate the terminal device to report measurement results, obtained by the terminal device through the QoE measurement, of at least a part of the at least one measurement metric.

In other words, the second configuration information indicates that the measurement metrics reported by the terminal device are a subset of measurement metrics on which the terminal device performs the QoE measurement. For example, the at least part of measurement metrics may be at least one of the average throughput, the initial playout delay, the buffer level, the playout delay, the deterioration duration, the number of successively lost packets, the jitter duration, the synchronization loss duration, the round-trip time delay, the average bitrate, and the comparable quality viewpoint switching latency.

In a specific example, when the terminal device measures five measurement metrics including an average throughput, an initial playout delay, a jitter duration, a synchronization loss duration, and an average bitrate during the QoE measurement, the second configuration information may indicate the terminal device to report measurement results of a part or all of the five measurement metrics. For example, the second configuration information may indicate the terminal device to report measurement results of two measurement metrics: the average throughput and the initial playout delay.

It should be noted that a sequence of step 410 and step 420 is not limited in this embodiment of this application. That is, step 410 may be performed before or after step 420, or step 410 and step 420 may be performed at the same time.

In a possible implementation, the second configuration information may include indication information #1, to indicate the at least part of measurement metrics. For example, the indication information #1 may be identifiers of the at least part of measurement metrics. This is not limited in this embodiment of this application.

For example, the indication information #1 may indicate the terminal device to report the measurement results of the measurement metrics in a form perceived by the access network device (for example, in a non-container form), and the indication information #1 does not specify specific measurement metrics. The protocol specifies measurement results of specific measurement metrics that the terminal device can report in a form perceived by the access network device (for example, in a non-container form). When the terminal device receives the indication information #1, for the measurement results, of those measurement metrics, that the terminal device can report in the form perceived by the access network device as specified in the protocol and that correspond to the first configuration information, the terminal device reports the measurement results in a form perceived by the access network device. This is not limited in this embodiment of this application.

In embodiments of this application, "perceived" may alternatively be replaced with "visible", "learned", "detected", or the like. This is not limited.

In some optional embodiments, the access network device may generate the second configuration information based on a radio resource management (Radio Resource Management, RRM) algorithm of the access network device.

In some optional embodiments, the CN/OAM/EM may send indication information #2 to the access network device, to indicate the at least one measurement metric measured when the terminal device performs the QoE measurement. Then, the access network device may generate the second configuration information based on the indication information #2.

For example, the CN/OAM/EM may send the indication information #2 to the access network device when sending the QoE measurement configuration information to the access network device. For example, in the QoE measurement configuration information, in addition to notifying the first configuration information (that is, the application layer measurement configuration information) in the container, the indication information #2 is additionally included outside the container in the QoE measurement configuration information. To be specific, in addition to the container, some measurement metrics (that is, application layer indicators) for the QoE measurement performed by the terminal device are additionally notified to the access network device. These application layer indicators may be, for example, application layer indicators considered important by the CN/OAM/EM. Therefore, the access network device may know the application layer indicators to be measured by the terminal device during the QoE measurement. In this case, the access network device may select some application layer indicators from these application layer indicators as application layer indicators that the terminal device is indicated to report in the second configuration information.

In some other embodiments, the CN/OAM/EM may alternatively notify the access network device of the indication information #2 in another message or in another manner. This is not limited in this embodiment of this application.

In some other embodiments, the access network device receives the indication information #2 from the CN/OAM/EM, and the access network device sends the indication information #2 to another access network device. For example, w % ben a terminal device in an RRC connected mode is in a handover scenario or an RRC re-setup scenario, or when a serving cell of UE in an RRC inactive mode changes, a source access network device sends the indication information #2 to a target access network device, or a master node sends the indication information #2 to a secondary node.

In some possible implementations, the part of measurement metrics indicated by the second configuration information may be a subset of the at least one measurement metric indicated by the indication information #2.

In some possible implementations, the part of measurement metrics indicated by the second configuration information may be a new measurement metric obtained based on a measurement metric in a subset of the at least one measurement metric indicated by the indication information #2. For example, the new measurement metric may be obtained based on the initial playout delay and the playout delay, for example, may be a measurement metric obtained by performing weighting based on the two measurement metrics. This is not limited in this embodiment of this application.

In some possible implementations, the second configuration information may not specify a specific measurement metric, but indicate a measurement result of a measurement metric related to specific performance.

In an example, the second configuration information may indicate to report a measurement result corresponding to a measurement metric related to a delay. In a possible case, for a streaming service, the measurement result of the delay is a measurement result of an initial playout delay and a playout delay. In another possible case, for a voice service, the measurement result of the delay is measurement results of at least two of a deterioration duration, a jitter duration, a synchronization loss duration, and a round-trip time delay.

In another example, the second configuration information may indicate to report a measurement result corresponding to a measurement metric related to a throughput. For example, the terminal device is indicated to report the measurement result of the throughput during the QoE measurement. In a possible case, for a streaming service, the measurement result of the throughput is a measurement result of an average throughput and a buffer level. In another possible case, for a voice service, the measurement result of the throughput is measurement results of at least two of a number of successively lost packets and an average codec bitrate.

Optionally, in this embodiment of this application, the CN/OAM/EM may notify the access network device of a QoE measurement reporting period or a measurement period. In this way, the access network device may determine, based on the QoE measurement reporting period or the measurement period, time for receiving the QoE measurement result.

Optionally, the access network device may determine, based on capability information of the terminal device, whether the access network device generates the second configuration information. For example, the terminal device may report a piece of capability information, to indicate that reporting of a measurement result of the QoE measurement in a form perceived by the access network device is supported. The access network device generates the second configuration information only when the terminal device reports that the capability is supported. The access network device may obtain the capability information from the terminal device, or may obtain the capability information from a core network device. For example, an access network device #1 may obtain the capability from the terminal device. The access network device #1 may send the capability information to the core network device. Subsequently, the core network device may further send the capability information to an access network device #2.

Optionally, the terminal device further reports a piece of capability information, to indicate that the QoE measurement is supported. The access network device generates the first configuration information only when the terminal device reports that the capability is supported. The access network device may obtain the capability information from the terminal device, or may obtain the capability information from a core network device. For example, an access network device #1 may obtain the capability from the terminal device. The access network device #1 may send the capability information to the core network device. Subsequently, the core network device may further send the capability information to an access network device #2.

Optionally, the access network device may determine, based on that a user corresponding to the terminal device agrees to report the measurement result of the QoE measurement in the form perceived by the access network device or agrees that the access network device triggers the QoE measurement that can be perceived by the access network device, that the access network device generates the second configuration information. For example, the core network device sends indication information to the access network device, to indicate whether the user agrees to report the measurement result of the QoE measurement in the form perceived by the access network device or agrees that the access network device triggers the QoE measurement that can be perceived by the access network device (for example, the core network device includes the indication information in an initial context setup request message sent to the access network device). The indication information may be in a plurality of forms. For example, the indication information may be a Boolean indication. When a value of the Boolean indication is true, it indicates that the user agrees to report the measurement result of the QoE measurement in the form perceived by the access network device or agrees that the access network device triggers the QoE measurement that can be perceived by the access network device. When the value of the Boolean indication is false, it indicates that the user does not agree to report the QoE measurement result in the form perceived by the access network device or does not agree that the access network device triggers the QoE measurement that can be perceived by the access network device. For another example, the Boolean indication has only one value. When the value of the Boolean indication is true, it indicates that the user corresponding to the terminal device agrees to report the measurement result of the QoE measurement in the form perceived by the access network device or agrees that the access network device triggers the QoE measurement that can be perceived by the access network device. When the core network device does not send the indication information to the access network device, it indicates that the user corresponding to the terminal device does not agree to report the measurement result of the QoE measurement in the form perceived by the access network device or does not agree that the access network device triggers the QoE measurement that can be perceived by the access network device. It should be noted that the indication information may be one or more corresponding public land mobile networks (public land mobile networks, PLMNs) indicating that the user agrees to report the measurement result of the QoE measurement in the form perceived by the access network device or agrees that the access network device triggers the QoE measurement that can be perceived by the access network device. For example, each PLMN corresponds to one piece of indication information, or when an identifier of a PLMN appears, it indicates that the user agrees that when the terminal device accesses the PLMN, the terminal device reports the measurement result of the QoE measurement in the form perceived by the access network device, or agrees that the access network device triggers the QoE measurement that can be perceived by the access network device.

430. The access network device sends the first configuration information and the second configuration information to the terminal device.

For example, the terminal device may send the first configuration information and the second configuration information to the terminal device in one message (for example, an RRC message), or may separately send the first configuration information and the second configuration information to the terminal device in different messages (for example, two different RRC messages). This is not limited in this embodiment of this application.

It should be noted that in step 430, the first configuration information is sent to the terminal device still in a container. In other words, the first configuration information may be sent to the terminal device still in a manner in a conventional technology. In addition, the second configuration information is not sent to the terminal device by being encapsulated in a container (for example, is explicitly sent to the terminal device by using an information element (information element), where specific meanings of such information elements can be known by the access network device and an RRC layer of the terminal device).

In a possible case, when the first configuration information and the second configuration information are sent in one RRC message, the second configuration information may be additionally included outside a container in the RRC message. In another possible case, when the first configuration information and the second configuration information are sent in two RRC messages, the second configuration information does not need to be encapsulated in a container in an RRC message corresponding to the second configuration information.

In some embodiments, the RRC message including the first configuration information and/or the RRC message including the second configuration information may further include the service type in the QoE measurement and the like. This is not limited in this embodiment of this application.

In some embodiments, the access network device may broadcast the second configuration information in a broadcast message. In this case, all terminal devices that are in a cell of the access network device and that are performing QoE measurement may report, based on the second configuration information, measurement results of at least a part of measurement metrics obtained through the QoE measurement.

For signaling based QoE measurement, the access network device sends the first configuration information and the second configuration information to corresponding terminal devices. Optionally, the access network device may further determine, based on whether a terminal device supports QoE measurement, whether to configure QoE measurement for the terminal device.

For management based QoE measurement, the access network device selects, based on the QoE measurement configuration information sent by the OAM/EM and corresponding QoE measurement supported by a terminal device, or some other factors, an appropriate terminal device to perform QoE measurement. After selecting a terminal device, the access network device sends the first configuration information and the second configuration information to the corresponding terminal device. For example, a manner in which the access network device selects a terminal device to perform QoE measurement is basically the same as that in common MDT measurement.

Correspondingly, the terminal device receives the first configuration information and the second configuration information.

After receiving the first configuration information, the terminal device may obtain the first configuration information in the container, and perform QoE measurement on the application layer of the terminal device based on the first configuration information. Optionally, the terminal device may report, according to a solution in the conventional technology, a measurement result obtained through the QoE measurement. Herein, the measurement result obtained through the QoE measurement is a measurement result corresponding to the first configuration information, and may be the same as that in the conventional technology. Details are not described.

After receiving the second configuration information, the terminal device may report, based on the second configuration information, the measurement results of the at least part of measurement metrics obtained through the QoE measurement. Herein, the measurement results of the at least part of measurement metrics are measurement results corresponding to the second configuration information, and are measurement results related to at least a part (that is, a part or all) of measurement metrics obtained through the QoE measurement.

Herein, the terminal device may explicitly send an existing measurement result (for example, the measurement results of the at least part of measurement metrics obtained through the QoE measurement) to the access network device, so that the access network device can perceive the measurement results. For example, the terminal device may explicitly report measurement values of the at least part of measurement metrics obtained through the QoE measurement, a reporting event for the at least part of measurement metrics, or the like. This is not limited in this embodiment of this application.

In some possible descriptions, in this embodiment of this application, the measurement result (that is, the QoE measurement result) corresponding to the first configuration information and the measurement results (that is, the measurement results of the at least part of measurement metrics obtained through the QoE measurement) corresponding to the second configuration information may be referred to as a QoE measurement related measurement result. This embodiment of this application is not limited thereto.

For example, an access stratum (access stratum, AS) of the terminal device may receive the first configuration information and the second configuration information that are sent by the access network device. Then, the access stratum may perform the following steps 440 and 450.

440. After receiving the first configuration information sent by the access network device, the access stratum may send first information to an upper layer (upper layer) of the access stratum based on the first configuration information. The first information indicates the upper layer to perform application layer QoE measurement. In an example, the first information may be the first configuration information, or new information generated based on the first configuration information. This is not limited in this embodiment of this application.

450. After receiving the second configuration information sent by the access network device, the access stratum may send second information to the upper layer (upper layer) of the access stratum based on the second configuration information. The second information indicates the upper layer to report the measurement results of the at least part of measurement metrics obtained through the QoE measurement. In an example, the second information may be the second configuration information, or new information (for example, including information such as the measurement metrics in the second configuration information) generated based on the second configuration information. This is not limited in this embodiment of this application.

For example, the upper layer of the access stratum may be, for example, the application (application. APP) layer, or may be a layer for QoE measurement. This is not limited in this embodiment of this application.

It should be noted that the access stratum of the terminal device is a function layer for communication between the terminal device and the access network device. For example, the access stratum may include at least one of an RRC layer, a PDCP layer, an SDAP layer, an RLC layer, a MAC layer, and a PHY layer. For example, the RRC layer of the terminal device may receive the first configuration information and the second configuration information, and send the first information and the second information to an upper layer of the RRC layer based on the first configuration information and the second configuration information.

In addition, in this embodiment of this application, only an example in which the access stratum of the terminal device receives the first configuration information and the second configuration information is used for description. This embodiment of this application is not limited thereto. For example, the first configuration information and the second configuration information may alternatively be received by another layer of the terminal device, or another module or unit of the terminal device.

Optionally, the access stratum of the terminal device may further send the service type in the QoE measurement to the upper layer of the terminal device. Optionally, when sending the first information to the upper layer of the access stratum, the access stratum indicates the service type related to the QoE measurement. Optionally, when sending the second information to the upper layer of the access stratum, the access stratum indicates the service type related to the QoE measurement. This is not limited in this embodiment of this application.

Correspondingly, the upper layer of the terminal device receives the first information and the second information. For example, the upper layer may perform the QoE measurement on the application layer based on the first information; and report, based on the second information, the measurement results of the at least part of measurement metrics obtained through the QoE measurement.

In some embodiments, the access stratum of the terminal device may send the first information and the second information to the upper layer of the terminal device in one message (for example, a notification message). In this case, step 440 and step 450 may be performed simultaneously.

In some other embodiments, the access stratum of the terminal device may separately send the first information and the second information to the upper layer of the terminal device in different messages (for example, two different notification messages). This is not limited in this embodiment of this application. In this case, a sequence of step 440 and step 450 is not limited.

In some other embodiments, the access network device may send the first configuration information and the second configuration information to another access network device. For example, when a terminal device in an RRC connected mode is in a handover scenario or an RRC re-setup scenario, or when a serving cell of a terminal device in an RRC inactive mode changes, the source access network device may send the first configuration information and the second configuration information to the target access network device. Therefore, the target access network device knows that the source access network device previously configures the first configuration information and the second configuration information for the terminal device, so that the target access network device can modify or delete the second configuration information based on a requirement of the target access network device.

After obtaining the first information and the second information, the access stratum of the terminal device may perform the QoE measurement, and report, based on the second information, the measurement results of the at least part of measurement metrics obtained through the QoE measurement. Specifically, for a process of performing the QoE measurement and a process of reporting the measurement results, refer to descriptions in step 507 to step 512 in FIG. 5, refer to descriptions in step 605 to step 608 in FIG. 6, or refer to descriptions in step 705 to step 708 in FIG. 7.

Therefore, in this embodiment of this application, the access network device sends the second configuration information to the terminal device, so that the access network device indicates the terminal device to report the measurement results of the at least part of measurement metrics obtained when the terminal device performs the QoE measurement. In this way, the access network device can perceive the measurement result of the QoE measurement. When the access network device can perceive the QoE measurement results, the access network device can further use the measurement results of the terminal device to, for example, adjust a resource configured for the terminal device, to improve user experience.

Figure 5:
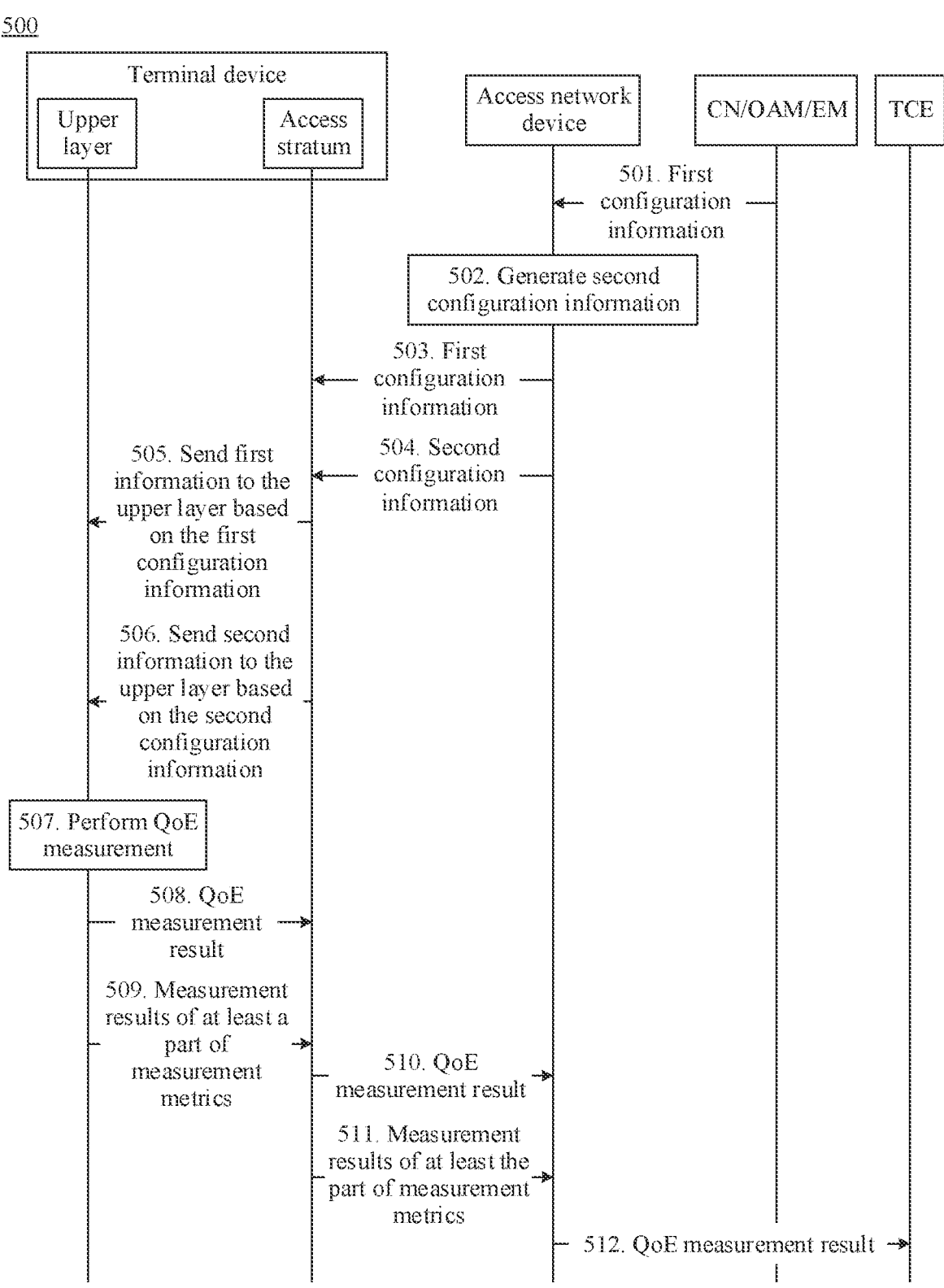
FIG. 5 is a schematic flowchart of another communication method according to an embodiment of this application.

FIG. 5 is a schematic flowchart of a communication method 500 according to an embodiment of this application. In the method 500, second configuration information may include a configuration of a reporting event for measurement metrics and a reporting period for reporting the measurement results of the at least part of measurement metrics. As shown in FIG. 5, the method 500 includes step 501 to step 512.

501. A CN/OAM/EM sends first configuration information to an access network device.

Specifically, for step 501, refer to the descriptions in step 410 in FIG. 4. For brevity, details are not described herein again.

502. The access network device generates second configuration information. The second configuration information is used by the access network device to indicate a terminal device to report measurement results of at least a part of measurement metrics obtained through QoE measurement. Specifically, for "measurement results of at least a part of measurement metrics obtained through QoE measurement", how the access network device generates the second configuration information, and content included in the second configuration information, refer to the descriptions in step 420 in FIG. 4. For brevity, details are not described herein again.

In some optional embodiments of this application, the second configuration information may further include a configuration of a reporting event for the measurement metrics. The reporting event for the measurement metrics is that measurement values of the measurement metrics are higher than a first threshold or the measurement values of the measurement metrics are lower than a second threshold.

In other words, the terminal device reports the reporting event only when the measurement values of the measurement metrics obtained through the QoE measurement performed by the terminal device meet the reporting event. Correspondingly, when receiving the reporting event reported by the terminal device, the access network device may learn that the measurement values of the measurement metrics obtained by the terminal device through the QoE measurement meet a threshold corresponding to the reporting event. In this case, the measurement results of the at least part of measurement metrics may be the reporting event.

In some possible implementations, the second configuration information may include a configuration of a reporting event for a part or all of the at least part of measurement metrics obtained through the QoE measurement of the terminal device. For example, when the second configuration information indicates the terminal device to report measurement results of two measurement metrics: an average throughput and an initial playout delay, the second configuration information may further include a configuration of a reporting event for the average throughput and/or the initial playout delay.

In a possible implementation, one measurement metric may correspond to one reporting event. For example, when the second configuration information indicates the terminal device to report measurement results of two measurement metrics: an average throughput and an initial playout delay, the second configuration information may include a configuration of a reporting event for the average throughput and a configuration of a reporting event for the initial playout delay.

Correspondingly, when one of the plurality of measurement metrics meets a reporting event corresponding to the measurement metric, the terminal device may report the reporting event for the measurement metric. For example, when a measurement value of an average throughput obtained by the terminal device by performing the QoE measurement meets a reporting event for the average throughput, the terminal device reports the reporting event for the average throughput.

In another possible implementation, a plurality of measurement metrics may correspond to one reporting event. For example, when the second configuration information indicates the terminal device to report measurement results of two measurement metrics: an average throughput and an initial playout delay, the second configuration information may include a configuration of a reporting event for the average throughput and the initial playout delay. The reporting event is, for example, that the average throughput is lower than the first threshold and the initial playout delay is higher than the second threshold. When both the average throughput and the initial playout delay meet the condition, the terminal device reports the reporting event.

Correspondingly, the terminal device can report the reporting event only when each of the plurality of measurement metrics meets the reporting event. For example, when a measurement value of an average throughput obtained by the terminal device by performing the QoE measurement is lower than the first threshold and an initial playout delay is higher than the second threshold, the terminal device reports a reporting event for the average throughput and the initial playout delay. For another example, when a measurement value of an average throughput obtained by the terminal device by performing the QoE measurement is lower than the first threshold and an initial playout delay is lower than or equal to the second threshold, the terminal device does not report a reporting event corresponding to the average throughput and the initial playout delay. For another example, when a measurement value of an average throughput obtained by the terminal device by performing the QoE measurement is higher than or equal to the first threshold and an initial playout delay is higher than the second threshold, the terminal device does not report a reporting event corresponding to the average throughput and the initial playout delay.

Optionally, the second configuration information may further include an identifier corresponding to the reporting event, for identifying the reporting event. In this case, when reporting the reporting event, the terminal device may report the identifier of the reporting event. Correspondingly, when receiving the identifier, the access network device may determine that the measurement metrics obtained through the QoE measurement meet the reporting event corresponding to the measurement metrics.

Optionally, the second configuration information further includes indication information #3, to indicate the terminal device to report the measurement values of the measurement metrics.

For example, when the second configuration information includes both the reporting event for the measurement metrics and the indication information #3, the terminal device may report the measurement values of the measurement when reporting the reporting event for the measurement metrics (for example, reporting the identifier of the event).

In some optional embodiments of this application, the second configuration information may include a plurality of reporting events, different measurement metrics may correspond to different reporting events, and the terminal device separately processes these reporting events in the foregoing manner.

In some embodiments, the second configuration information further includes a reporting period for reporting the measurement results of the at least part of measurement metrics by the terminal device. Herein, the reporting period may be the same as or different from an existing QoE reporting period, or may be the same as or different from an existing measurement period of QoE measurement. This is not limited in this embodiment of this application. In this way, the terminal device may periodically report the measurement results of the part of measurement metrics to the access network device based on the reporting period.

503. The access network device sends the first configuration information to an access stratum of the terminal device.

504. The access network device sends the second configuration information to the access stratum of the terminal device.

For example, for step 503 and step 504, refer to the descriptions in step 430 in FIG. 4. For brevity, details are not described herein again.

505. The access stratum of the terminal device sends first information to an upper layer of the terminal device based on the first configuration information.

For example, for step 505, refer to the descriptions in step 440 in FIG. 4. For brevity, details are not described herein again.

506. The access stratum of the terminal device sends second information to the upper layer of the terminal device based on the second configuration information.

For example, for step 506, refer to the descriptions in step 450 in FIG. 4. For brevity, details are not described herein again.

In addition, when the second configuration information includes the configuration of the measurement event for the measurement metrics, the second information may further include the configuration of the event for the measurement metrics. When the second configuration information includes the identifier of the measurement event, the second information may further include the identifier. When the second configuration information includes the reporting period for reporting the measurement results of the measurement metrics, the second information may further include the reporting period. This is not limited in this embodiment of this application.

507. The upper layer of the terminal device performs the QoE measurement.

For example, the upper layer may perform the QoE measurement based on the first information, and obtain a QoE measurement result. Specifically, for the QoE measurement, refer to descriptions in a conventional technology. Details are not described herein.

508. The upper layer sends the QoE measurement result to the access stratum.

For example, when determining, based on the first information, that the QoE measurement result needs to be reported, the upper layer of the terminal device may report the QoE measurement result according to a specific rule. In some embodiments, the rule may be included in the first information. This is not limited in this embodiment of this application. For example, the upper layer may periodically report the QoE measurement result based on a QoE reporting period, or report the QoE measurement result only after a session ends. This is not limited in this embodiment of this application.

In some optional embodiments, the upper layer of the access stratum of the terminal device may further indicate a service type corresponding to the QoE measurement result. This is not limited in this embodiment of this application.

509. The upper layer sends the measurement results of the at least part of measurement metrics, that is, the measurement results of the at least part of measurement metrics obtained through the QoE measurement, to the access stratum.

Specifically, the upper layer may send, based on the second information, the measurement results of the at least part of measurement metrics, that is, the measurement results corresponding to the second configuration information, to the access stratum.

For example, when the upper layer of the access stratum of the terminal device performs the QoE measurement, the terminal device determines that the measurement results of the measurement metrics that need to be reported and that are indicated by the second information meet the reporting event corresponding to the measurement metrics, or that the upper layer may send a notification message to the access stratum when the reporting period indicated by the second information arrives, where the notification message includes the measurement results of the at least part of measurement metrics. The measurement results of the measurement metrics may be, for example, the reporting event for the measurement metrics and/or the measurement values of the measurement metrics.

When the second information includes the identifier of the reporting event for the measurement metrics, the upper layer may send the identifier to the access stratum to indicate that the measurement metrics meet the reporting event.

In some embodiments, when the reporting period for reporting the measurement results of the at least part of measurements is different from a reporting period for reporting the QoE measurement result, the upper layer of the access stratum may separately perform steps 508 and 509 based on their respective reporting periods or reporting manners. For example, when the QoE reporting period arrives, step 508 is performed; when the reporting period for reporting the measurement results of the at least part of measurement metrics arrives, step 509 is performed.

In some embodiments, when the reporting period for reporting the measurement results of the at least part of measurement metrics is the same as the reporting period for reporting the QoE measurement result, the upper layer of the access stratum may include the QoE measurement result and the measurement results of the at least part of measurement metrics in one notification message, and send the notification message to the access stratum. This embodiment of this application is not limited thereto. For example, the upper layer may include the QoE measurement result and the measurement results of the at least part of measurement metrics in two notification messages respectively, and send the two notification messages to the access stratum at the same time.

In some embodiments, when the second configuration information does not include the reporting period or the reporting event, the upper layer of the access stratum of the terminal device may report the measurement results of the at least part of measurement metrics according to a reporting rule in the first information. For example, the upper layer of the access stratum may include the QoE measurement result and the measurement results of the at least part of measurement metrics in one notification message, and send the notification message to the access stratum. This embodiment of this application is not limited thereto. For example, the upper layer may include the QoE measurement result and the measurement results of the at least part of measurement metrics in two notification messages respectively, and send the two notification messages to the access stratum at the same time.

In some embodiments, when the measurement metrics in the second information are new measurement metrics obtained from at least one measurement metric of the QoE measurement, before the upper layer sends the measurement results of the at least part of measurement metrics to the access stratum, the upper layer obtains measurement results of the new measurement metrics based on a measurement result of the measurement metric of the QoE measurement, for example, obtains the measurement results of the new measurement metrics by performing weighting based on the measurement result of the at least one measurement metric of the QoE measurement.

In some embodiments, when the second configuration information does not specify a specific measurement metric, but indicates a measurement result of a measurement metric related to specific performance, for example, a delay or a throughput, the measurement results of the at least part of measurement metrics are measurement results corresponding to all measurement metrics related to the performance.

510. The access stratum sends the QoE measurement result to the access network device.

For example, the access stratum of the terminal device may send an uplink RRC message to the access network device, and the message includes the QoE measurement result. Herein, the QoE measurement result is also sent to the access network device in a container.

In some optional embodiments, the RRC message may further include the service type corresponding to the QoE measurement result. This is not limited in this embodiment of this application.

511. The access stratum sends the measurement results of the at least part of measurement metrics to the access network device.

For example, the access stratum of the terminal device may send an uplink RRC message to the access network device, and the message includes the measurement results of the at least part of measurement metrics.

It should be noted that an access network device that delivers the first configuration information and the second configuration information and an access network device that receives a measurement result may not be a same access network device, or may be a same access network device. This is not limited in this embodiment of this application. For example, when the terminal device switches a serving access network device due to mobility of the terminal device, two access network devices are not a same access network device.

In some embodiments, when the reporting period for reporting the measurement results of the at least part of measurement metrics is different from the reporting period for reporting the QoE measurement results, the access stratum may separately perform steps 508 and 509 based on the notification message received from the upper layer. That is, when the notification message including the QoE measurement result arrives, step 510 is performed; when the notification message including the measurement results of the at least part of measurement metrics arrives, step 511 is performed.

In some embodiments, when the reporting period for reporting the measurement results of the at least part of measurement metrics is the same as the reporting period for reporting the QoE measurement result, the access stratum may include the QoE measurement result and the measurement results of the at least part of measurement metrics in one RRC message, and send the RRC message to the access network device. This embodiment of this application is not limited thereto. For example, the access stratum may include the QoE measurement result and the measurement results of the at least part of measurement metrics in two RRC messages respectively, and send the two RRC messages to the access network device at the same time.

When the QoE measurement result and the measurement results of the at least part of measurement metrics are sent in a same RRC message, the QoE measurement result may be encapsulated in a container in the RRC message, and the measurement results of the at least part of measurement metrics may not be included in a container outside the container in the RRC message (for example, the measurement results are explicitly sent to the terminal device by using an information element (information element), where specific meanings of such information elements can be known by the access network device and the RRC layer of the terminal device).

When the QoE measurement result and the measurement results of the at least part of measurement metrics are sent in two RRC messages, the QoE measurement result may be encapsulated in a container in an RRC message carrying the measurement result, and the measurement results of the at least part of measurement metrics are not in a container in an RRC message corresponding to the measurement results.

In some optional embodiments, the access network device may configure a signaling bearer (for example, an SRB4) for the terminal device to transmit the QoE measurement related measurement result. For example, a transmission priority of the SRB4 is lower than a priority of another SRB.

Correspondingly, the access network device receives the measurement results of the at least part of measurement metrics from the terminal device.

For example, after receiving the measurement results of the at least part of measurement metrics reported by the terminal device, the access network device may adjust a radio resource based on the measurement results.

For example, when an average throughput, a buffer level, an average bitrate, or the like is lower than a specific threshold, or an initial playout delay, a playout delay, a deterioration duration, a number of successively lost packets, a jitter duration, a synchronization loss duration, a round-trip time delay, or the like is higher than a specific threshold, the access network device may increase a resource allocation priority of the terminal device, to schedule more resources for the terminal device or preferentially schedule the terminal device, thereby improving subsequent application layer measurement performance of the terminal device.

On the contrary, when an average throughput, a buffer level, an average bitrate, or the like is higher than a specific threshold, or an initial playout delay, a playout delay, a deterioration duration, a number of successively lost packets, a jitter duration, a synchronization loss duration, a round-trip time delay, or the like is lower than a specific threshold, the access network device may decrease a resource allocation priority of the terminal device, to schedule fewer resources for the terminal device or unpreferentially schedule the terminal device, thereby reducing application layer measurement performance of the terminal device and saving air interface resources. Optionally, the access network device may use these resources for another terminal device, to improve application layer measurement performance of the another terminal device.

In some optional embodiments, the access network device may further adjust a QoS parameter of the terminal device based on the measurement results of the at least part of measurement metrics. Then, the access network device may indicate the CN to adjust the QoS parameter. For example, the access network device previously learns of, from the CN, a plurality of levels of QoS parameters corresponding to a service of the terminal device. After obtaining the measurement results of the at least part of measurement metrics obtained based on the QoE measurement, on the service type, of the terminal device, the access network device may determine, based on the measurement results, that the levels of the QoS parameters corresponding to the service need to be adjusted. In this case, the access network device may send indication information #4 (which, for example, may include one target level) to the CN, to request the CN to adjust the QoS parameters of the service to QoS parameters at the target level, indicate that the CN can adjust the QoS parameters to QoS parameters at a higher level or a lower level, or request the CN to adjust the QoS parameters to QoS parameters at a higher level or a lower level.

Optionally, after receiving the measurement results that are of the measurement metrics and that are reported by the terminal device, the access network device may send indication information #5 to the CN, to notify the measurement values of the measurement metrics or notify an event (where for example, the measurement values are higher than a threshold or lower than a threshold) that the measurement values meet, or indicate that the measurement metrics can be met or cannot be met, so that performance of the measurement metrics can be indicated to the CN.

In some optional embodiments, that the access network device receives the measurement results that are of the measurement metrics and that are reported by the terminal device means that a CU of the access network device receives the measurement results that are of the measurement metrics and that are reported by the terminal device. The CU of the access network device may further send indication information to a DU of the access network device, to notify the measurement values of the measurement metrics or notify an event (where for example, the measurement values are higher than a threshold or lower than a threshold) that the measurement values meet, or indicate that the measurement metrics can be met or cannot be met, so that performance of the measurement metrics can be indicated to the DU of the access network device. Therefore, the DU of the access network device can adjust a radio resource allocated to the terminal device.

512. The access network device sends the QoE measurement result to a trace collection entity (trace collection entity, TCE).

Therefore, in this embodiment of this application, the access network device sends the second configuration information to the terminal device, to indicate the terminal device to report the measurement results (where for example, the measurement results are a reporting event) of the at least part of measurement metrics when the at least part of measurement metrics obtained through the QoE measurement meet the reporting event. In addition, the terminal device may further report the measurement results of the at least part of measurement metrics based on the reporting period indicated by the second configuration information. Therefore, in this embodiment of this application, the access network device can perceive the measurement result of the QoE measurement, so that the access network device can further use the measurement results of the terminal device in a timely manner, for example, adjust a resource configured for the terminal device, to improve user experience.

Figure 6:
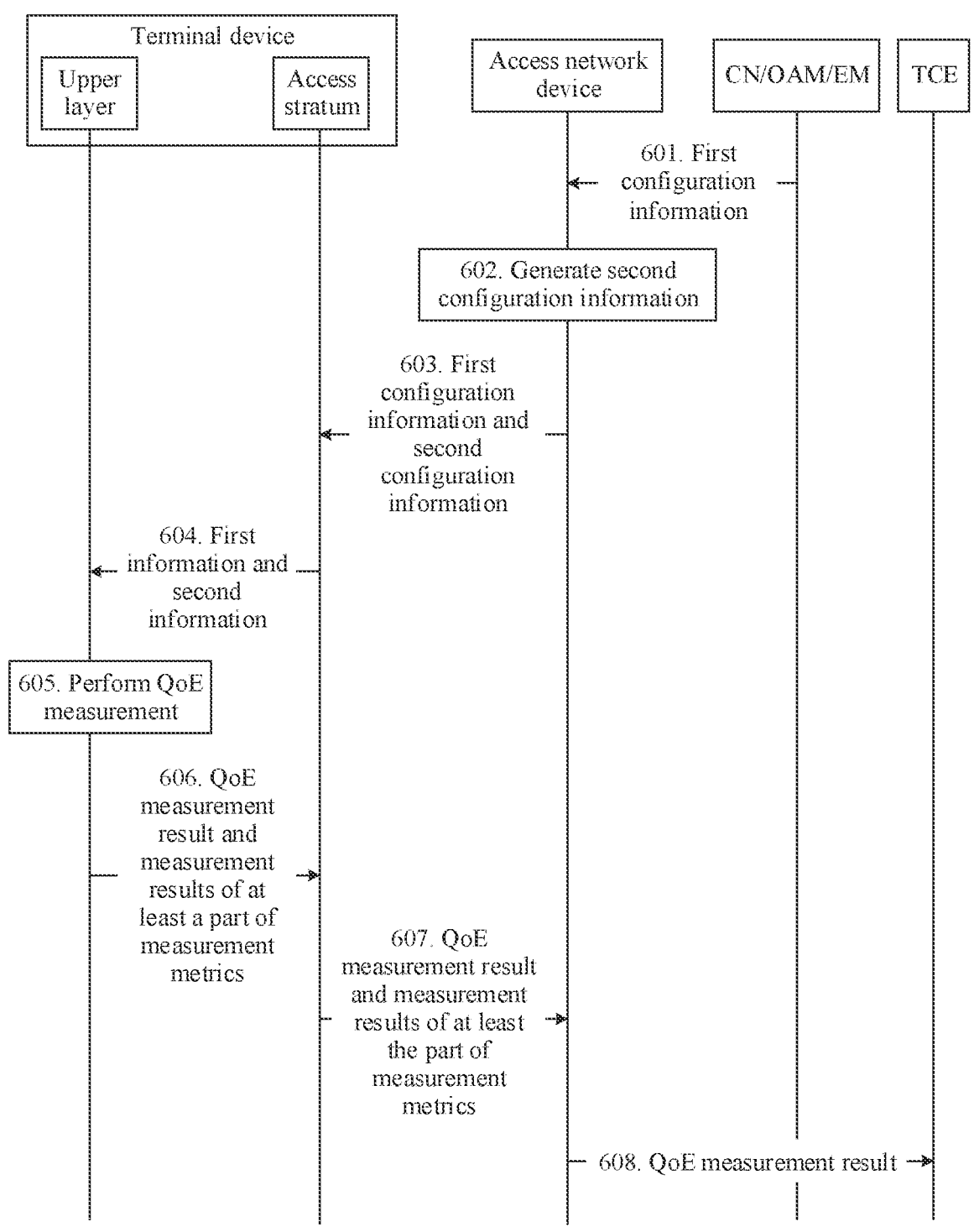
FIG. 6 is a schematic flowchart of another communication method according to an embodiment of this application.

FIG. 6 is a schematic flowchart of a communication method 600 according to an embodiment of this application. In the method 600, second configuration information may include a configuration of a reporting event for measurement metrics. As shown in FIG. 6, the method 600 includes step 601 to step 608.

601. A CN/OAM/EM sends first configuration information to an access network device.

Specifically, for step 601, refer to the descriptions in step 410 in FIG. 4. For brevity, details are not described herein again.

602. The access network device generates second configuration information.

Specifically, for step 602, refer to the descriptions in step 502 in FIG. 5.

Herein, different from the second configuration information in step 502, the second configuration information in step 602 does not include a reporting period for reporting the measurement results of the at least part of measurement metrics. In this case, the access network device may indicate, by default, the terminal device to report the measurement results of the at least part of measurement metrics in a QoE measurement result reporting manner (for example, based on an existing QoE reporting period or at the end of a session) or in a QoE measurement result reporting manner in the first configuration information.

603. The access network device sends the first configuration information and the second configuration information to the terminal device.

For example, when the second configuration information does not include the reporting period, the first configuration information and the second configuration information may be included in one RRC message and sent to the terminal device. This embodiment of this application is not limited thereto. For example, in another implementation, the first configuration information and the second configuration information may be included in different RRC messages and sent to the terminal device.

604. An access stratum of the terminal device sends first information and second information to an upper layer of the access stratum.

Specifically, the access stratum of the terminal device sends the first information and the second information to the upper layer of the access stratum based on the first configuration information and the second configuration information. Specifically, for the first information and the second information, refer to the foregoing descriptions (refer to the descriptions in steps 505 and 506 in FIG. 5). For brevity, details are not described herein again.

Herein, when the second configuration information does not include the reporting period, the first information and the second information may be included in one notification message and sent to the upper layer. This embodiment of this application is not limited thereto. For example, in another implementation, the first information and the second information may be included in different notification messages and sent to the upper layer.

605. The upper layer performs the QoE measurement.

Specifically, for step 605, refer to the descriptions in step 507 in FIG. 5. For brevity, details are not described herein again.

606. The upper layer sends a QoE measurement result and the measurement results of the at least part of measurement metrics to the access stratum.

For example, when the upper layer obtains the QoE measurement result based on the first information and the second information indicates the reporting event for the measurement metrics, and when the upper layer determines, based on the second information, that the measurement values of the measurement metrics in the QoE measurement result meet the corresponding reporting event, the upper layer sends the QoE measurement result and the measurement results of the at least part of measurement metrics to the access stratum. Herein, for the QoE measurement result and the measurement results of the at least part of measurement metrics, refer to the foregoing related descriptions in FIG. 4 and FIG. 5. Details are not described herein again.

When the upper layer obtains the QoE measurement result based on the first information and the second information does not indicate the reporting event for measurement metrics (that is, the measurement results of the at least part of measurement metrics are periodically reported), the upper layer of the access stratum may include the QoE measurement result and the measurement results of the at least part of measurement metrics in one notification message, and send the notification message to the access stratum in a QoE measurement result reporting manner (for example, based on an existing QoE reporting period or at the end of a session). This embodiment of this application is not limited thereto. For example, in another implementation, the QoE measurement result and the measurement results of the at least part of measurement metrics may alternatively be included in different notification messages and sent to the access stratum.

607. The access stratum sends the QoE measurement result and the measurement results of the at least part of measurement metrics to the access network device.

When the second configuration information does not include the reporting period, the access stratum may include the QoE measurement result and the measurement results of the at least part of measurement metrics in one RRC message and send the RRC message to the access network device. This embodiment of this application is not limited thereto. For example, in another implementation, the QoE measurement result and the measurement results of the at least part of measurement metrics may alternatively be included in different RRC messages and sent to the access network device.

Correspondingly, the access network device receives the QoE measurement result and the measurement results of the at least part of measurement metrics. In this case, for a processing process of the access network device, refer to the descriptions in FIG. 5. For brevity, details are not described herein again.

608. The access network device sends the QoE measurement result to a TCE.

Therefore, in this embodiment of this application, the access network device sends the second configuration information to the terminal device, to indicate the terminal device to report the measurement results (where for example, the measurement results are a reporting event) of the at least part of measurement metrics when the at least part of measurement metrics obtained through the QoE measurement meet the reporting event. In addition, in addition to reporting the QoE measurement result in the QoE measurement reporting manner, the terminal device may further report the measurement results of the at least part of measurement metrics in the QoE measurement reporting manner. Therefore, in this embodiment of this application, the access network device can perceive the measurement result of the QoE measurement, so that the access network device can further use the measurement results of the terminal device in a timely manner, for example, adjust a resource configured for the terminal device, to improve user experience.

In the foregoing embodiments (including FIG. 5 and FIG. 6), the access network device indicates, based on the second configuration information, the terminal device to report, to the access network device, a part of measurement results obtained through the QoE measurement. In another implementation method, the part of measurement results obtained through the QoE measurement that need to be reported by the terminal device to the access network device may be agreed on in advance, and do not need to be indicated by the access network device. In this case, the second configuration information does not need to be sent. After performing the QoE measurement, the UE reports the corresponding measurement results of a part of measurement metrics according to the agreement. For example, measurement results corresponding to an average throughput, an initial playout delay, and the like are reported by default. In this implementation method, the terminal device still performs processing according to the method for reporting the measurement results of the at least part of measurement metrics in the foregoing embodiments (including that the upper layer sends the measurement results of the at least part of measurement metrics to the access stratum and the access stratum sends the measurement results of the at least part of measurement metrics to the access network device).

Figure 7:
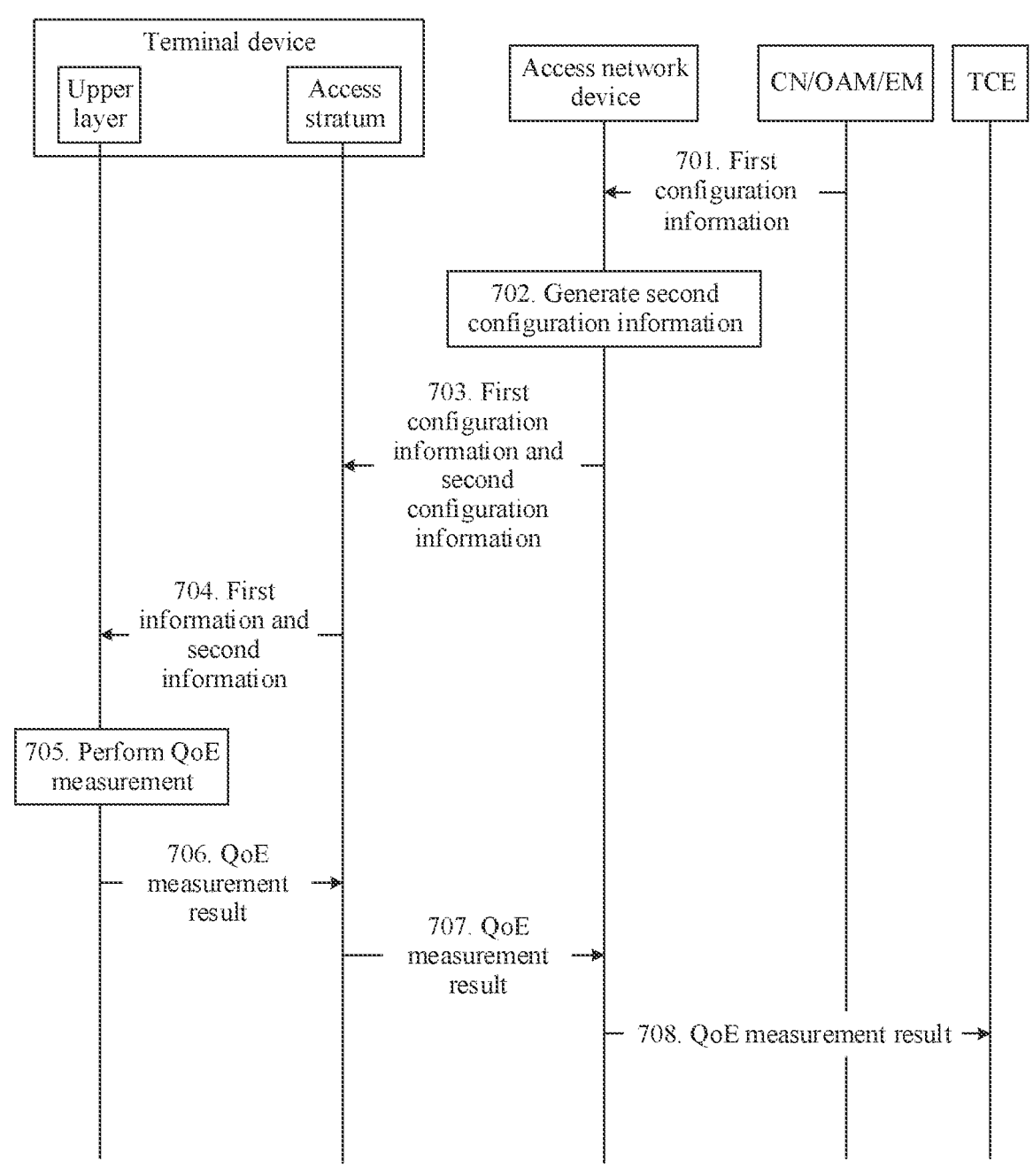
FIG. 7 is a schematic flowchart of another communication method according to an embodiment of this application.

FIG. 7 is a schematic flowchart of a communication method 700 according to an embodiment of this application. In the method 700, second configuration information may include a configuration of a reporting event for measurement metrics. Different from the method 600, in the method 700, when the reporting event is met, a terminal device may report only a QoE measurement result; or when the reporting event is not met, the terminal device does not report a QoE measurement related measurement result, that is, neither reports the QoE measurement result nor reports measurement results of at least a part of measurement metrics obtained through QoE measurement. As shown in FIG. 7, the method 70) includes step 701 to step 708.

701. A CN/OAM/EM sends first configuration information to an access network device.

702. The access network device generates second configuration information.

703. The access network device sends the first configuration information and the second configuration information to a terminal device.

704. An access stratum of the terminal device sends first information and second information to an upper layer of the access stratum.

705. The upper layer performs QoE measurement.

For example, for step 701 to step 705, refer to the descriptions in steps 601 to 605 in FIG. 6. For brevity, details are not described herein again.

706. The upper layer sends the QoE measurement result to the access stratum.

For example, when a measurement value of the measurement metric obtained through the QoE measurement in step 705 meets a reporting event corresponding to the measurement metric, the upper layer of the terminal device may send the QoE measurement result to the access stratum in a QoE measurement result reporting manner. When the measurement value of the measurement metric obtained through the QoE measurement does not meet the reporting event corresponding to the measurement metric, the upper layer of the terminal device may not report a related measurement result obtained through the QoE measurement, for example, neither report the QoE measurement result nor report the measurement results of the at least part of measurement metrics obtained through the QoE measurement. In other words, in this embodiment of this application, the reporting event for the measurement metrics in the second configuration information may be a reporting condition under which the terminal device determines, when performing the QoE measurement, whether to report the QoE measurement result.

For the QoE measurement result, refer to the foregoing related descriptions in FIG. 4 to FIG. 6. For brevity, details are not described herein again.

707. The access stratum sends the QoE measurement result to the access network device. Correspondingly, the access network device receives the QoE measurement result. Herein, when the access network device determines that the QoE measurement result is received, the access network device may determine that the at least part of measurement metrics obtained through the QoE measurement meet the reporting event. On the contrary, when the access network device does not receive the QoE measurement result within preset time (where for example, the time may be determined based on an obtained QoE measurement period or reporting period), the access network device may determine that the at least part of measurement results obtained through the QoE measurement do not meet the reporting event. In other words, in this case, the access network device may perceive the QoE measurement result.

For example, for a processing manner performed after the access network device receives the QoE measurement result and perceives the QoE measurement result, refer to the foregoing descriptions. For brevity, details are not described herein again.

In step 706 and step 707, when the measurement value of the measurement metric obtained through the QoE measurement meets the reporting event, a QoE measurement result reporting manner may be the same as that in a conventional technology. This is not limited in this embodiment of this application.

708. The access network device sends the QoE measurement result to a TCE.

Therefore, in this embodiment of this application, the access network device sends the second configuration information to the terminal device, to indicate the terminal device to report, when the at least part of measurement metrics obtained through the QoE measurement meet the reporting event, the QoE measurement result obtained through the QoE measurement. Correspondingly, when receiving the QoE measurement result, the access network device can determine that the part of measurement metrics indicated in the second configuration information meet the reporting event, and further perceive the measurement result of the QoE measurement. Therefore, in this embodiment of this application, the access network device can use the measurement results of the terminal device in a timely manner, for example, adjust a resource configured for the terminal device, to improve user experience.

Figure 8:
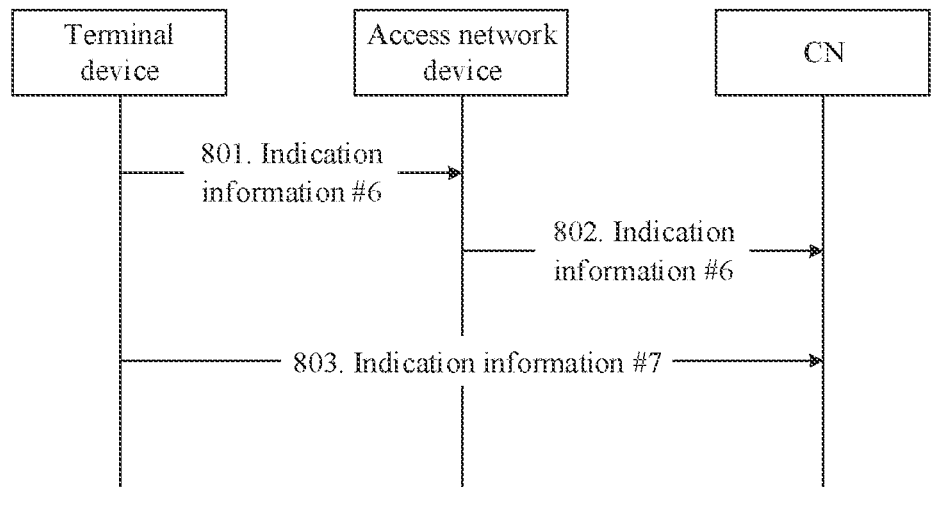
FIG. 8 is a schematic flowchart of another communication method according to an embodiment of this application.

FIG. 8 is a schematic flowchart of a communication method 800 according to an embodiment of this application. In the method 800, a terminal device may indicate, to a network side (for example, an access network device or a CN), a service type for which the terminal device prefers to perform QoE measurement, whether the terminal device prefers to perform QoE measurement, a measurement metric on which the terminal device prefers to perform QoE measurement, or the like. As shown in FIG. 8, the method 800 includes step 801 to step 803.

801. A terminal device sends indication information #6 to an access network device, where the indication information #6 indicates a service type for which the terminal device prefers (preferred) to perform QoE measurement, whether the terminal device prefers to perform QoE measurement, a measurement metric on which the terminal device prefers to perform QoE measurement, or the like. This is not limited in this embodiment of this application. Optionally, "prefer" in this application may also be referred to as "expect" or "be willing".

For example, the terminal device may include the indication #6 in UE assistance information (UE assistance information), an RRC setup complete message, an RRC reconfiguration complete message, an RRC resume complete message, or an RRC re-setup complete message. This is not limited in this embodiment of this application.

Correspondingly, the access network device receives the indication information #6. After receiving the indication information #6, the access network device may learn of, based on the indication information #6, the service type for which the terminal device prefers to perform QoE measurement, whether the terminal device prefers to perform QoE measurement, the measurement metric on which the terminal device prefers to perform QoE measurement, or the like.

For example, for management based QoE measurement, the access network device may determine, based on the indication information #6, whether to configure QoE measurement for the terminal device, or a service type in QoE measurement configured for the terminal device, or configure measurement results of at least a part of measurement metrics that are obtained through QoE measurement and that are reported by the terminal device, that is, configure measurement metrics in second configuration information (that is, the second configuration information in FIG. 4/5/6/7). For example, for signaling based QoE measurement, the access network device may configure, based on the indication information #6, measurement results of at least a part of measurement metrics that are obtained through QoE measurement and that are reported by the terminal device, that is, configure measurement metrics in second configuration information.

802. The access network device sends the indication information #6 to a CN.

For example, when receiving the indication information #6, the access network device may further send the indication information #6 to the CN. After receiving the indication information #6, the CN may learn whether to subsequently initiate signaling based QoE measurement for the terminal device, a service type in signaling based QoE measurement, or a measurement metric of QoE measurement.

It should be noted that FIG. 8 is described by using an example in which the access network device sends the indication information #6 to the CN. In another possible embodiment, the access network device may alternatively send the indication information #6 to another network side device, for example, an OAM or an EM. This is not limited in this embodiment of this application.

803. The terminal device sends indication information #7 to the CN, where the indication information #7 indicates a service type for which the terminal device prefers to perform QoE measurement, whether the terminal device prefers to perform QoE measurement, a measurement metric on which the terminal device prefers to perform QoE measurement, or the like. This is not limited in this embodiment of this application.

For example, the terminal device may indicate, to the CN by including the indication information #7 in a NAS message, the service type for which the terminal device prefers to perform QoE measurement, whether the terminal device prefers to perform QoE measurement, the measurement metric on which the terminal device prefers to perform QoE measurement, or the like.

It should be noted that, in this embodiment of this application, when step 802 is performed, step 803 may not need to be performed; or when step 803 is performed, step 802 may not need to be performed. This is not limited in this embodiment of this application.

Therefore, in this embodiment of this application, the terminal device indicates, to the network side device, the service type for which the terminal device prefers to perform QoE measurement, whether the terminal device prefers to perform QoE measurement, or the measurement metric on which the terminal device prefers to perform QoE measurement, so that the network side device can pertinently select a terminal device to perform QoE measurement, helping reduce air interface overheads.

Figure 9:
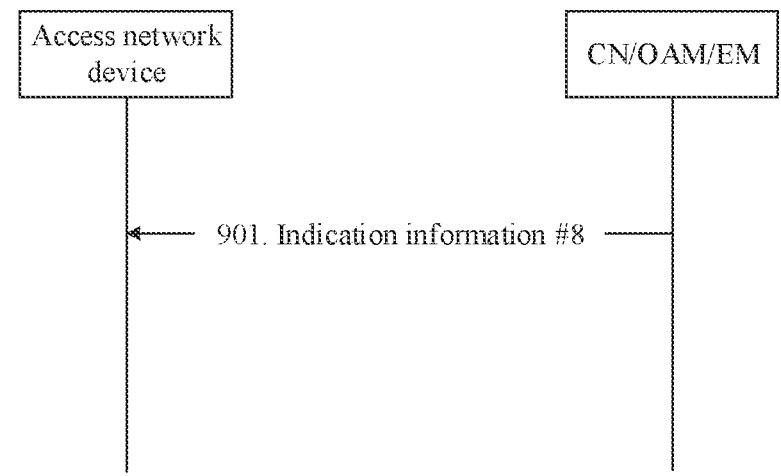
FIG. 9 is a schematic flowchart of another communication method according to an embodiment of this application.

FIG. 9 is a schematic flowchart of a communication method 900 according to an embodiment of this application. In the method 900, a CN may indicate, to an access network device, a service type for which a terminal device prefers to perform QoE measurement, whether the terminal device prefers to perform QoE measurement, a measurement metric on which the terminal device prefers to perform QoE measurement, or the like. As shown in FIG. 9, the method 900 includes step 901.

901. A CN sends indication information #8 to an access network device, where the indication information #8 indicates a service type for which a terminal device prefers to perform QoE measurement, whether the terminal device prefers to perform QoE measurement, a measurement metric on which the terminal device prefers to perform QoE measurement, or the like. This is not limited in this embodiment of this application. Optionally, "prefer" in this application may also be referred to as "expect" or "be willing".

For example, the CN may send the indication information #8 by using signaling between the CN and the access network device for a specific terminal device. The indication information #8 indicates the service type for which the terminal device prefers to perform QoE measurement, whether the terminal device prefers to perform QoE measurement, the measurement metric on which the terminal device prefers to perform QoE measurement, or the like. This is not limited in this embodiment of this application.

In some embodiments, the CN may learn of, based on step 803 in FIG. 8, the service type for which the terminal device prefers to perform QoE measurement, whether the terminal device prefers to perform QoE measurement, the measurement metric on which the terminal device prefers to perform QoE measurement, or the like. This is not limited in this embodiment of this application. Alternatively, in some other embodiments, the CN may learn of the information in another manner. This is not limited in this embodiment of this application.

Correspondingly, the access network device receives the indication information #8 from the CN. In some optional embodiments, for example, for management based QoE measurement, the access network device may determine, based on the indication information #8, whether to configure QoE measurement for the terminal device, or a service type in QoE measurement configured for the terminal device, or configure measurement results of at least a part of measurement metrics that are obtained through QoE measurement and that are reported by the terminal device, that is, configure measurement metrics in second configuration information (that is, the second configuration information in FIG. 4/5/6/7). For example, for signaling based QoE measurement, the access network device may configure, based on the indication information #6, measurement results of at least a part of measurement metrics that are obtained through QoE measurement and that are reported by the terminal device, that is, configure measurement metrics in second configuration information.

Therefore, in this embodiment of this application, the CN indicates, to the access network device, the service type for which the terminal device prefers to perform QoE measurement, whether the terminal device prefers to perform QoE measurement, or the measurement metric on which the terminal device prefers to perform QoE measurement, so that the access network device can pertinently select a terminal device to perform QoE measurement, helping reduce air interface overheads.

In some optional embodiments, an access network device that delivers first configuration information to the terminal device and an access network device that delivers second configuration information to the terminal device may be different access network devices. For example, an access network device #1 may deliver the first configuration information to the terminal device, and an access network device

2 may deliver the second configuration information to the terminal device. In an example, the access network device #1 and the access network device #2 may provide an MR-DC service for the terminal device. In other words, one of the access network device #1 and the access network device #2 may be an MN, and the other may be an SN. This embodiment of this application is not limited thereto. For example, one or more access network devices may serve the terminal device.

Figure 10:
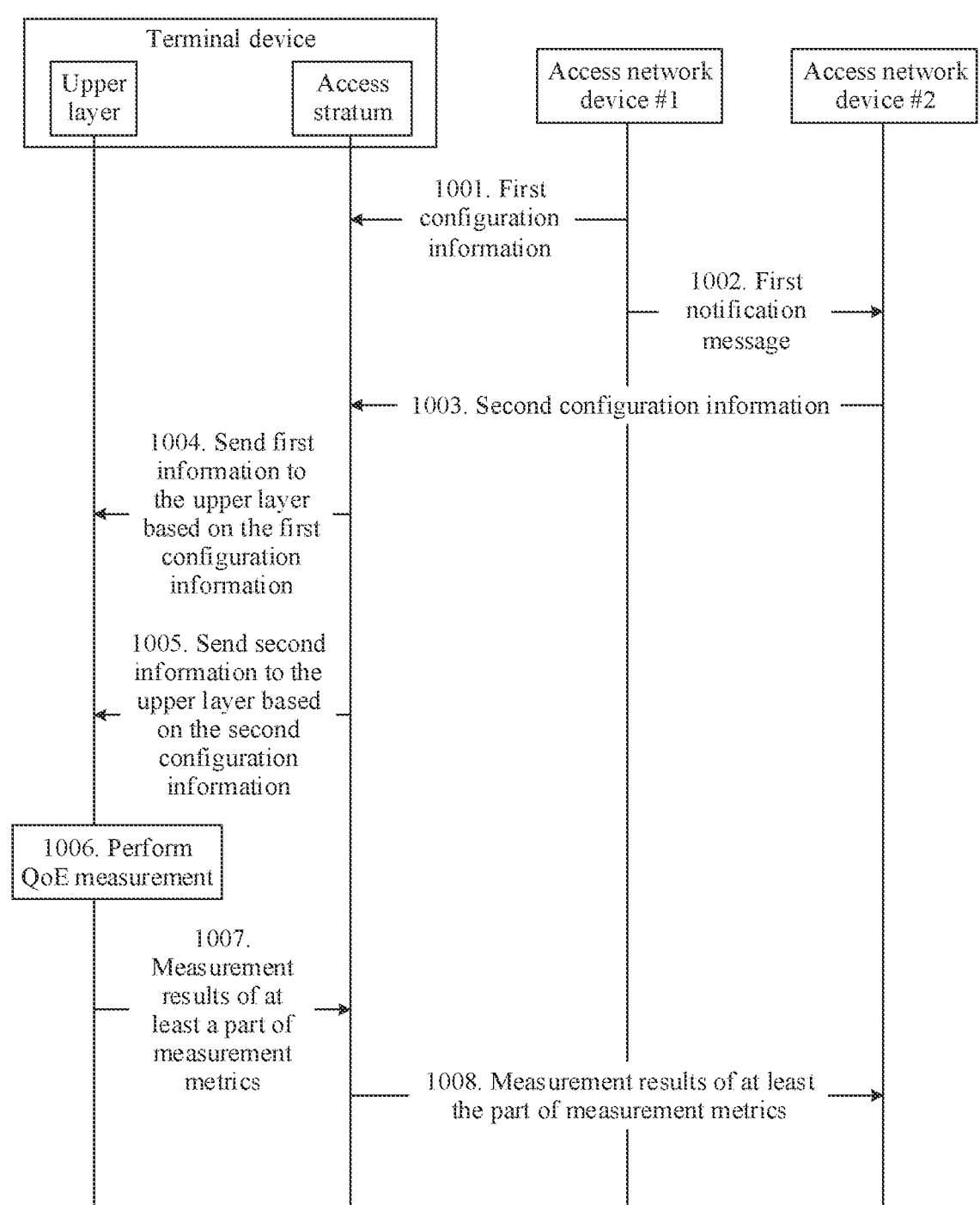
FIG. 10 is a schematic flowchart of another communication method according to an embodiment of this application.
Figure 11:
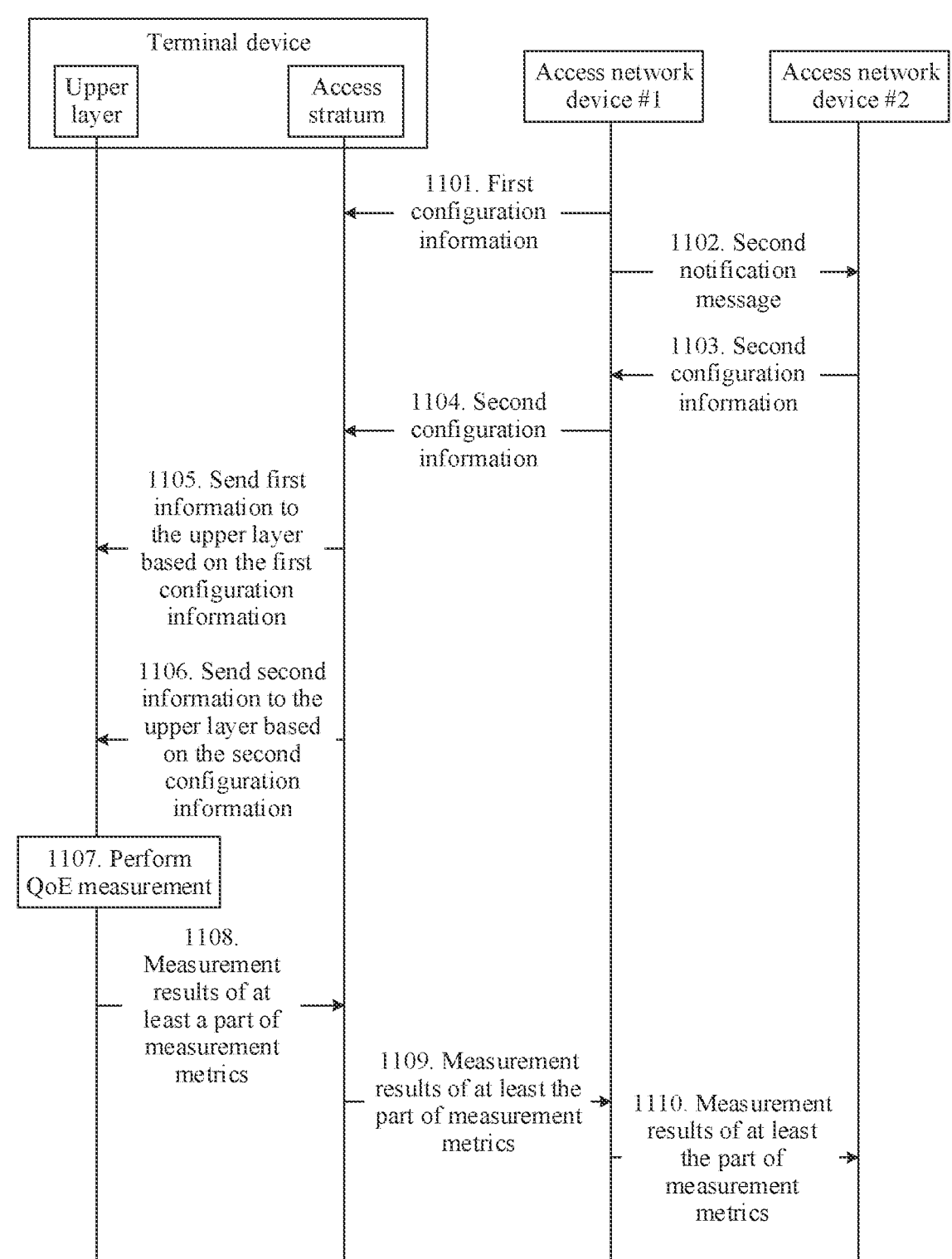
FIG. 11 is a schematic flowchart of another communication method according to an embodiment of this application.

FIG. 10 and FIG. 11 each are a schematic flowchart of a communication method according to embodiments of this application. In FIG. 10 and FIG. 11, an access network device #1 delivers first configuration information to a terminal device, and an access network device #2 delivers second configuration information to the terminal device.

Refer to FIG. 10. The method 1000 includes steps 1001 to 1008.

1001. An access network device #1 sends first configuration information to an access stratum of a terminal device. Herein, for the first configuration information and a manner of sending the first configuration information, refer to the foregoing descriptions. For brevity, details are not described again.

1002. The access network device #1 sends a first notification message to an access network device #2, to notify the access network device #2 that the access network device #1 has sent the first configuration information to the terminal device.

Optionally, the access network device #1 may further send indication information #2 to the access network device #2, to indicate at least one measurement metric measured when the terminal device performs QoE measurement. Herein, for the indication information #2, refer to the foregoing descriptions in step 420 in FIG. 4. For brevity, details are not described herein again.

Optionally, the access network device #1 sends the indication information #2 to the access network device #2 only when capability information of the terminal device indicates that reporting of a measurement result of the QoE measurement in a form perceived by an access network device is supported.

Optionally, the access network device #1 sends the indication information #2 to the access network device #2 only when the access network device #1 learns that a user corresponding to the terminal device agrees to report a measurement result of the QoE measurement in a form perceived by an access network device or agrees that an access network device triggers QoE measurement that can be perceived by the access network device.

Optionally, the access network device #1 may further send, to the access network device #2, a capability that is in the capability information of the terminal device and that indicates that reporting of the measurement result of the QoE measurement in the form perceived by the access network device is supported. Optionally, the access network device #1 may further send, to the access network device #2, indication information indicating whether the user agrees to report the measurement result of the QoE measurement in the form perceived by the access network device or agrees that the access network device triggers the QoE measurement that can be perceived by the access network device. For specific descriptions of the indication information, refer to the descriptions in step 420 in FIG. 4.

1003. The access network device #2 sends second configuration information to the access stratum of the terminal device. Herein, for a manner of sending the second configuration, refer to the foregoing descriptions. For brevity, details are not described again.

In some optional embodiments, the access network device #2 may further send indication information #9 to the terminal device, to indicate first configuration information corresponding to the second configuration information sent by the access network device #2 to the terminal device, to be specific, to indicate that the terminal device reports measurement results of at least a part of measurement metrics obtained through measurement based on which first configuration information. In an example, the indication information #9 may indicate to report measurement results of at least a part of measurement metrics that are obtained through measurement based on first configuration information delivered by an MN (for example, the access network device #1), or report measurement results of at least a part of measurement metrics that are obtained based on first configuration information delivered by an SN (for example, the access network device #2). Optionally, further, the indication information #9 may further include a service type corresponding to the first configuration information corresponding to the second configuration information.

In some optional embodiments, the access network device #2 may further send indication information #10 to the terminal device, to indicate a service type that is in QoE measurement and that correspond to the second configuration information. Optionally, the terminal device can learn of, based on the service type that is in the QoE measurement and that correspond to the second configuration information, the first configuration information corresponding to the second configuration information (where for example, QoE measurement for a specific service type is configured by only one access network device in the MN or the SN for the terminal device).

It should be noted that, that the access network device #2 sends the second configuration information, the indication information #9, and the indication information #10 to the terminal device includes: The access network device #2 directly sends the information to the terminal device (for example, by using an RRC message between the access network device #2 and the terminal device, where the RRC message may also be referred to as an SRB3). Alternatively, the sending includes: The access network device #2 generates an RRC message #1, where the RRC message #1 includes the foregoing information: the access network device #2 sends the RRC message #1 to the access network device #1: then the access network device #1 generates an RRC message #2, where the RRC message #2 carries the RRC message #1; and the access network device #1 sends the RRC message #1 to the terminal device.

1004. The access stratum of the terminal device sends first information to an upper layer of the terminal device based on the first configuration information.

1005. The access stratum of the terminal device sends second information to the upper layer of the terminal device based on the second configuration information.

Specifically, for step 1004 and step 1005, refer to the descriptions of steps 440 and 450 in FIG. 4, the descriptions of steps 505 and 506 in FIG. 5, or step 604 in FIG. 6. For brevity, details are not described again.

1006. The upper layer of the terminal device performs the QoE measurement.

Specifically, refer to the descriptions in step 507 in FIG. 5. For brevity, details are not described herein again.

1007. The upper layer of the terminal device sends the measurement results of the at least part of measurement metrics to the access stratum of the terminal device.

Specifically, for step 1007, refer to the descriptions of step 509 in FIG. 5 or the descriptions of step 606 in FIG. 6. For brevity, details are not described again.

1008. The access stratum of the terminal device sends the measurement results of the at least part of measurement metrics to the access network device #2.

Specifically, for step 1008, refer to the descriptions of step 511 in FIG. 5 or step 607 in FIG. 6. For brevity, details are not described again.

Optionally, in the method 1000, the upper layer may further send a QoE measurement result to the access stratum, and the access stratum may send the QoE measurement result to the access network device #1. Specifically, refer to the descriptions of steps 508 and 510 in FIG. 5, or the descriptions of steps 606 and 607 in FIG. 6. For brevity, details are not described again.

It should be noted that an access network device #1 and an access network device #2 that deliver the first configuration information and the second configuration information may be different from or may be the same as an access network device #1 and an access network device #2 that receive the measurement results respectively. This is not limited in this embodiment of this application. For example, when the terminal device switches a serving access network device due to mobility of the terminal device, two access network devices are not a same access network device.

It should be further noted that, that the access stratum of the terminal device sends the measurement results of the at least part of measurement metrics to the access network device #2 includes: The terminal device directly sends the information to the access network device #2 (for example, by using an RRC message between the access network device #2 and the terminal device, where the RRC message may also be referred to as an SRB3). Alternatively, the sending includes: The terminal device generates an RRC message #3 corresponding to the access network device #2, where the RRC message #3 includes the foregoing information, the terminal device further generates an RRC message #4 corresponding to the access network device #1, where the RRC message #4 carries the RRC message #3: and after receiving the RRC message 4, the access network device #1 sends the RRC message #3 to the access network device #2.

In some other possible implementations, step 1008 may be alternatively replaced with: The access stratum of the terminal device sends the measurement results of the at least part of measurement metrics to the access network device #1. After receiving the measurement results of the at least part of measurement metrics, the access network device sends the measurement results to the access network device #2. For example, the terminal device generates an RRC message #4 corresponding to the access network device #1, where the RRC message #4 carries measurement results of the at least part of measurement metrics. After receiving the RRC message 4, the access network device #1 sends the measurement results of the at least part of measurement metrics to the access network device #2.

Optionally, when sending the measurement results of the at least part of measurement metrics to the access network device #1, the terminal device may include indication information #11, to indicate that these measurement results correspond to the access network device #2, for example, indicate that these measurement results are measurement results corresponding to the second configuration information delivered by the corresponding access network device #2, indicate that these measurement results need to be sent to the access network device #2, indicate that these measurement results correspond to an MN (that is, need to be sent to the MN), or indicate that these measurement results correspond to an SN (that is, need to be sent to the SN). In an example, a form of the indication information #11 may be a name of an information element that carries the measurement results of the at least part of measurement metrics (that is, a different name of the information element indicates that these measurement results correspond to the access network device #2).

Therefore, in this embodiment of this application, in the MR-DC architecture, the access network device #1 may send the first configuration information to the terminal device to indicate the terminal device to perform the QoE measurement, and the access network device #2 sends the second configuration information to the terminal device to indicate the terminal device to report the measurement results of the at least part of measurement metrics obtained through the QoE measurement. Therefore, the access network device #2 can perceive the measurement result of the QoE measurement, so that the access network device #2 can further use the measurement results of the terminal device in a timely manner, for example, adjust a resource configured for the terminal device, to improve user experience.

For example, the access network device #1 may send the first configuration information to the terminal device in a container, and the access network device #2 may send the second configuration information to the terminal device in a form (for example, a non-container form) that can be perceived by an access network device. Therefore, a measurement metric corresponding to the QoE measurement result received by the access network device #2 that delivers the second configuration information in the form that can be perceived by an access network device is based on a measurement metric in a delivered measurement configuration corresponding to the first configuration information in the container. In this way, in this application, the access network device #2 that does not deliver a QoE measurement configuration in the container can also obtain a measurement result of a related measurement metric in a form that can be perceived by the access network device #2.

Refer to FIG. 11. The method 1100 includes steps 1101 to 1110.

1101. An access network device #1 sends first configuration information to an access stratum of a terminal device. Herein, for the first configuration information and a manner of sending the first configuration information, refer to the foregoing descriptions. For brevity, details are not described again.

1102. The access network device #1 sends a second notification message to an access network device #2, to notify the access network device #2 that the access network device #1 sends the first configuration information to the terminal device.

In a possible case, the second notification message may notify the access network device #2 that the access network device #1 has sent the first configuration information to the terminal device. In another possible case, the second notification message may notify the access network device #2 that the access network device #1 is to send the first configuration information to the terminal device.

Optionally, the access network device #1 may further send indication information #2 to the access network device #2, to indicate at least one measurement metric measured when the terminal device performs QoE measurement. Herein, for the indication information #2, refer to the foregoing descriptions in step 420 in FIG. 4. For brevity, details are not described herein again.

1103. The access network device #2 sends second configuration information to the access network device #1.

In some optional embodiments, the access network device #2 may further send indication information #9 or indication information #10 to the access network device #1. For specific descriptions, refer to the foregoing descriptions.

1104. The access network device #1 sends the second configuration information to the access stratum of the terminal device. Herein, for the second configuration information and a manner in which the access network device #1 sends the second configuration information to the access stratum of the terminal device, refer to the foregoing descriptions. For brevity, details are not described again.

In some optional embodiments, the access network device #1 may further send the indication information #9 or the indication information #10 to the terminal device. For specific descriptions, refer to the foregoing descriptions.

It should be noted that when the second notification message is for notifying the access network device #2 that the access network device #1 has sent the first configuration information to the terminal device, steps 1101, 1102, 1103, and 1104 may be performed in sequence. When the second notification message is for notifying the access network device #2 that the access network device #1 is to send the first configuration information to the terminal device, there is no strict sequence among steps 1101, 1102, 1103, and 1104. For example, step 1101 and step 1104 may be performed at the same time, or the first configuration information in step 1101 and the second configuration information in step 1104 may be carried in a same message and sent to the access stratum of the terminal device.

1105. The access stratum of the terminal device sends first information to an upper layer of the terminal device based on the first configuration information.

1106. The access stratum of the terminal device sends second information to the upper layer of the terminal device based on the second configuration information.

Specifically, for step 1105 and step 1106, refer to the descriptions of steps 440 and 450 in FIG. 4, the descriptions of steps 505 and 506 in FIG. 5, or step 604 in FIG. 6. For brevity, details are not described again.

1107. The upper layer of the terminal device performs QoE measurement.

Specifically, refer to the descriptions in step 507 in FIG. 5. For brevity, details are not described herein again.

1108. The upper layer of the terminal device sends the measurement results of the at least part of measurement metrics to the access stratum of the terminal device.

Specifically, for step 1108, refer to the descriptions of step 509 in FIG. 5 or the descriptions of step 606 in FIG. 6. For brevity, details are not described again.

1109. The access stratum of the terminal device sends the measurement results of the at least part of measurement metrics to the access network device #1.

Specifically, for step 1109, refer to the descriptions of step 511 in FIG. 5 or step 607 in FIG. 6. For brevity, details are not described again.

1110. The access network device #1 sends the measurement results of the at least part of measurement metrics to the access network device #2.

Optionally, in the method 1100, the upper layer may further send a QoE measurement result to the access stratum, and the access stratum may send the QoE measurement result to the access network device #1. Specifically, refer to the descriptions of steps 508 and 510 in FIG. 5, or the descriptions of steps 606 and 607 in FIG. 6. For brevity, details are not described again.

Therefore, in this embodiment of this application, in the MR-DC architecture, the access network device #1 may send the first configuration information to the terminal device to indicate the terminal device to perform the QoE measurement, and the access network device #2 may send, via the access network device #1, the second configuration information to the terminal device to indicate the terminal device to report the measurement results of the at least part of measurement metrics obtained through the QoE measurement. Therefore, the access network device #2 can perceive the measurement result of the QoE measurement, so that the access network device #2 can further use the measurement results of the terminal device in a timely manner, for example, adjust a resource configured for the terminal device, to improve user experience.

For example, the access network device #1 may send the first configuration information to the terminal device in a container, and the access network device #2 may send the second configuration information to the terminal device in a form (for example, a non-container form) that can be perceived by an access network device. Therefore, a measurement metric corresponding to the QoE measurement result received by the access network device #2 that delivers the second configuration information that can be perceived by an access network device is based on a measurement metric in a delivered measurement configuration corresponding to the first configuration information in the container. In this way, in this application, the access network device #2 that does not deliver a QoE measurement configuration in the container can obtain a measurement result of a related measurement metric in a form that can be perceived by the access network device #2.

In some optional embodiments, an access network device may send configuration information for QoE measurement to the terminal device based on a requirement of the access network device, or may send configuration information for QoE measurement to the terminal device based on a requirement of a CN/OAM/EM. In this case, the access network device can flexibly configure a type of configuration information that is for QoE measurement.

Figure 12:
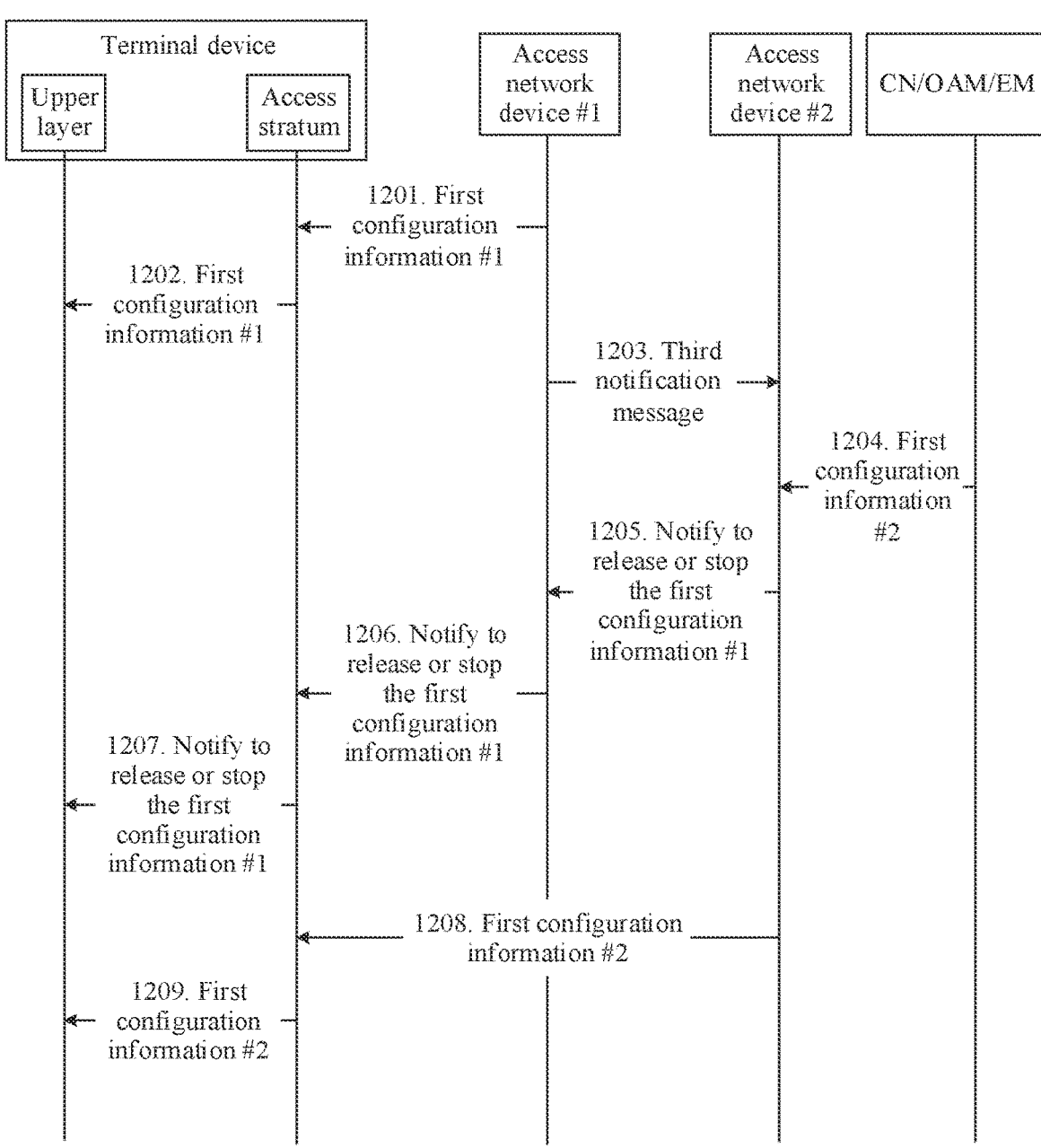
FIG. 12 is a schematic flowchart of another communication method according to an embodiment of this application.
Figure 13:
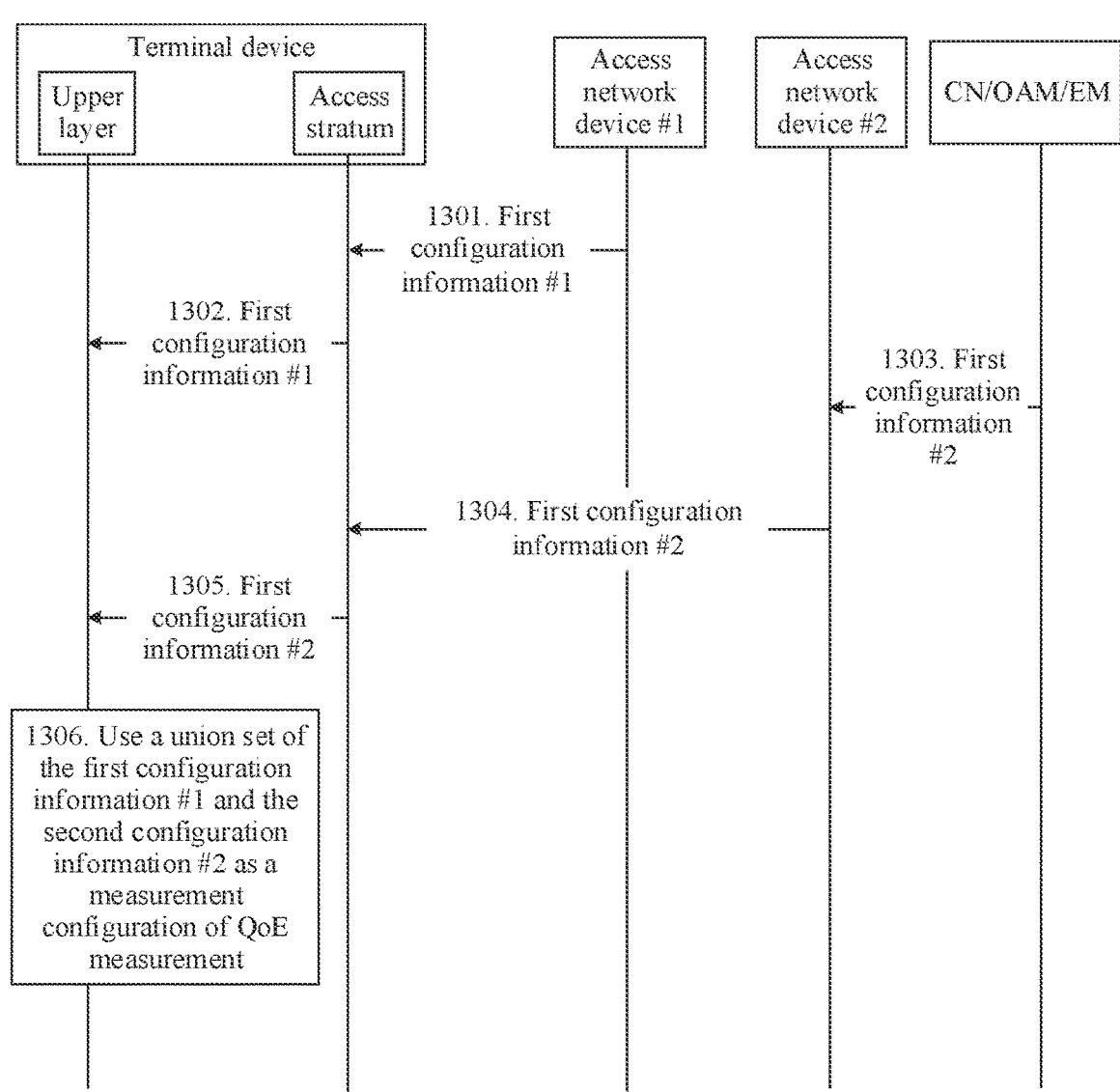
FIG. 13 is a schematic flowchart of another communication method according to an embodiment of this application.
Figure 14:
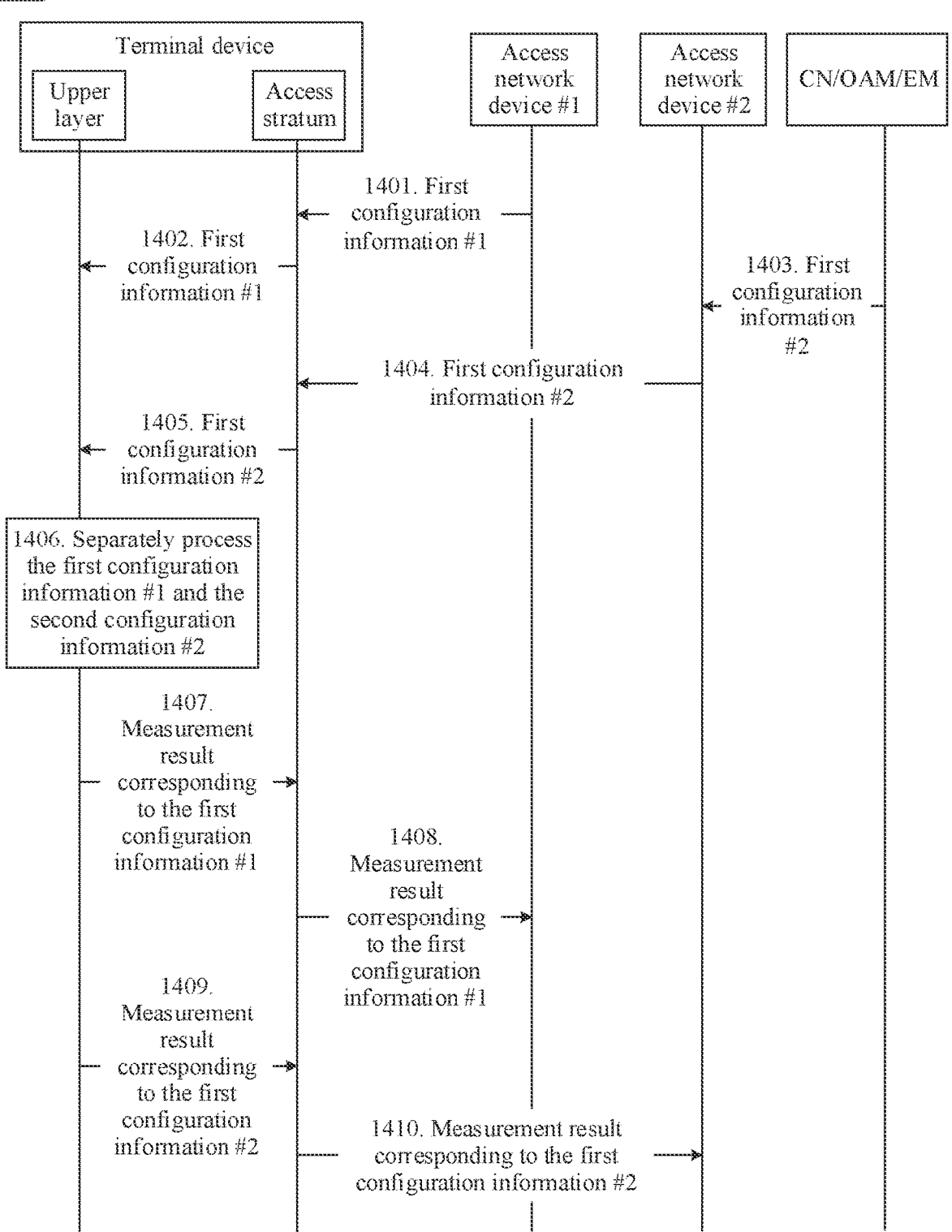
FIG. 14 is a schematic flowchart of another communication method according to an embodiment of this application.

FIG. 12 to FIG. 14 each are a schematic flowchart of a communication method according to embodiments of this application. In FIG. 12 to FIG. 14, configuration information for QoE measurement that is sent to a terminal device based on a requirement of an access network device may be sent to the terminal device in a form (for example, a non-container form) that can be perceived by the access network device or in a form (for example, a container) that cannot be perceived by the access network device, and configuration information for QoE measurement that is sent to the terminal device based on a requirement of a CN/OAM/EM may be sent to the terminal device in a container.

In an example, in FIG. 12 to FIG. 14, an access network device #1 and an access network device #2 may provide an MR-DC service for the terminal device. In other words, one of the access network device #1 and the access network device #2 may be an MN, and the other may be an SN. This embodiment of this application is not limited thereto. For example, one or more access network devices may serve the terminal device.

In addition, in some embodiments, the access network device #1 and the access network device #2 may be a same access network device. This is not limited in this application.

Refer to FIG. 12. In the method 1200, a terminal device preferentially performs QoE measurement based on configuration information that is for QoE measurement and that is received from a CN/OAM/EM. As shown in FIG. 12, the method 1200 includes steps 1201 to 1209.

1201. An access network device #1 sends first configuration information #1 to an access stratum of a terminal device.

The first configuration information #1 is a specific example of the first configuration information. Herein, the first configuration information #1 is configuration information that is for QoE measurement and that is sent by the access network device #1 to the terminal device based on a requirement of the access network device #1. That is, the access network device #1 does not send the first configuration information #1 based on the configuration information that is for QoE measurement and that is received from the CN/OAM/EM.

For example, the first configuration information #1 may be sent to the terminal device in a container or in a non-container form. This is not limited in this application.

Optionally, the access network device #1 may determine that the access network device generates the second configuration information #1, based on that a user corresponding to the terminal device agrees to report a measurement result of the QoE measurement in a form perceived by the access network device, agrees that the access network device triggers QoE measurement that can be perceived by the access network device, or agrees that the access network device triggers QoE measurement. For example, the core network device sends indication information to the access network device, to indicate whether the user agrees to report the measurement result of the QoE measurement in the form perceived by the access network device, agrees that the access network device triggers the QoE measurement that can be perceived by the access network device, or agrees that the access network device triggers the QoE measurement (for example, the core network device includes the indication information in an initial context setup request message sent to the access network device). The indication information may be in a plurality of forms. For example, the indication information may be a Boolean indication. When a value of the Boolean indication is true, it indicates that the user agrees to report the measurement result of the QoE measurement in the form perceived by the access network, agrees that the access network device triggers the QoE measurement that can be perceived by the access network device, or agrees that the access network device triggers the QoE measurement. When the value of the Boolean indication is false, it indicates that the user does not agree to report the QoE measurement result in the form perceived by the access network, does not agree that the access network device triggers the QoE measurement that can be perceived by the access network device, or does not agree that the access network device triggers the QoE measurement. For another example, the Boolean indication has only one value. When the value of the Boolean indication is true, it indicates that the user corresponding to the terminal device agrees to report the measurement result of the QoE measurement in the form perceived by the access network device, agrees that the access network device triggers the QoE measurement that can be perceived by the access network device, or agrees that the access network device triggers the QoE measurement. When the core network device does not send the indication information to the access network device, it indicates that the user corresponding to the terminal device does not agree to report the measurement result of the QoE measurement in the form perceived by the access network device, does not agree that the access network device triggers the QoE measurement that can be perceived by the access network device, or does not agree that the access network device triggers the QoE measurement. It should be noted that the indication information may be one or more corresponding PLMNs indicating that the user agrees to report the measurement result of the QoE measurement in the form perceived by the access network device, agrees that the access network device triggers the QoE measurement that can be perceived by the access network device, or agrees that the access network device triggers the QoE measurement. For example, each PLMN corresponds to one piece of indication information, or when an identifier of a PLMN appears, it indicates that the user agrees that when the terminal device accesses the PLMN, the terminal device reports the measurement result of the QoE measurement in the form perceived by the access network device, agrees that the access network device triggers the QoE measurement that can be perceived by the access network device, or agrees that the access network device triggers the QoE measurement.

1202. The access stratum of the terminal device sends the first configuration information #1 to an upper layer of the access stratum.

For example, that the access stratum of the terminal device sends the first configuration information #1 to the upper layer of the access stratum may be specifically implemented as follows: After receiving the first configuration information #1 sent by the access network device #1, the access stratum may send, to the upper layer of the access stratum based on the first configuration information #1, third information indicating the upper layer to perform application layer QoE measurement. In an example, the third information may be the first configuration information #1, or new information generated based on the first configuration information #1. This is not limited in this embodiment of this application.

1203. The access network device #1 sends a third notification message to an access network device #2. The third notification message is for notifying the access network device #2 that the access network device #1 has sent, to the terminal device, configuration information for triggering the QoE measurement, for example, the first configuration information #1.

It should be noted that a sequence of performing steps 1202 and 1203 is not limited herein. For example, step 1202 may be performed before or after step 1203, or step 1202 and step 1203 may be performed at the same time.

1204. The CN/OAM/EM sends first configuration information #2 to the access network device #2. Correspondingly, the access network device #2 receives the second configuration information #2.

The first configuration information #2 is a specific example of the first configuration information. Herein, the first configuration information #2 is received by the access network device #2 from the CN/OAM/EM.

For example, the first configuration information #2 may be in a container, that is, may be sent to the terminal device in a form that cannot be perceived by the access network device #2. This is not limited in this application.

1205. The access network device #2 notifies the access network device #1 to release or stop the first configuration information #1.

In other words, in this embodiment of this application, a priority of configuration information (that is, the first configuration information #2) that is for QoE measurement and that is sent to the terminal device based on a requirement of the CN/OAM/EM is higher than a priority of configuration information that is for QoE measurement and that is sent to the terminal device based on a requirement of the access network device.

In an example, releasing or stopping the first configuration information #1 may include releasing or stopping configuration information that is of a service type and for QoE measurement or the QoE measurement corresponding to configuration information that is of a service type and for the QoE measurement, or releasing or stopping configuration information that is for QoE measurement and that is sent in a non-container form or the QoE measurement corresponding to configuration information for the QoE measurement.

In a possible implementation, one service type may correspond to one piece of configuration information for QoE measurement. In this case, when configuration information that is of a service type and for QoE measurement is released or stopped, the configuration information or the QoE measurement corresponding to the configuration information is stopped or released.

1206. The access network device #1 notifies the access stratum of the terminal device to release or stop the first configuration information #1.

It should be noted that when the access network device #1 and the access network device #2 are a same access network device, that is, only one access network device serves the terminal device, the access network device may receive the first configuration information #2 from the CN/OAM/EM, and indicate the access stratum of the terminal device to release or stop the first configuration information #1. That is, step 1205 does not need to be performed.

1207. The access stratum of the terminal device notifies the upper layer of the access stratum to release or stop the first configuration information #1.

For example, that the access stratum of the terminal device notifies the upper layer of the access stratum to release or stop the first configuration information #1 may be specifically implemented as follows: After receiving a notification message that is sent by the access network device #1 and that is for notifying to release or stop the first configuration information #1, the access stratum may send, to the upper layer of the access stratum, fourth information indicating to release or stop the first configuration information #1. In an example, the fourth information may be information that is received by the access stratum from the access network device and that notifies to release or stop the first configuration information #1, or new information generated based on the received information that notifies to release or stop the first configuration information #1. This is not limited in this embodiment of this application.

For example, the fourth information may indicate the upper layer of the access stratum to release or stop configuration information that is for QoE measurement and that is of a specific service type, or release or stop configuration information that is for QoE measurement and that is sent in a non-container form.

1208. The access network device #2 sends the first configuration information #2 to the access stratum of the terminal device.

It should be noted that when the access network device #1 and the access network device #2 are a same access network device, that is, only one access network device serves the terminal device, the information for notifying to release or stop the first configuration information #1 and the first configuration information #2 may be carried in a same message and sent to the access stratum of the terminal device.

1209. The access stratum of the terminal device sends the first configuration information #2 to the upper layer.

For example, that the access stratum of the terminal device sends the first configuration information #2 to the upper layer may be specifically implemented as follows: After receiving the first configuration information #2 sent by the access network device #2, the access stratum may send, to the upper layer of the access stratum based on the first configuration information #2, fifth information indicating the upper layer to perform application layer QoE measurement. In an example, the fifth information may be the first configuration information #2, or new information generated based on the first configuration information #2. This is not limited in this embodiment of this application.

For example, the information for releasing or stopping the first configuration information #1 in step 1207 and the first configuration information #2 in step 1209 may be carried in a same message for sending, or may be carried in different messages for sending. This is not limited in this application.

After receiving the information for releasing or stopping the first configuration information #1 and the first configuration information #2, the upper layer releases the first configuration information #1, or stops performing QoE measurement based on the first configuration information #1, and starts to perform QoE measurement based on the first configuration information #2.

Therefore, in this embodiment of this application, when the access network device sends the configuration information for QoE measurement to the terminal device based on the requirement of the access network device, and sends the configuration information for QoE measurement to the terminal device based on the requirement of the CN/OAM/EM, the access network device may notify the terminal device to release or stop the configuration information that is for QoE measurement and that is sent based on the requirement of the access network device, so that the terminal device can preferentially perform QoE measurement based on the configuration information that is for QoE measurement and that is received from the CN/OAM/EM.

Refer to FIG. 13. In the method 1300, a terminal device may use a union set of measurement metrics in a QoE measurement configuration triggered by an access network device and a QoE measurement configuration from a CN/OAM/EM as a final measurement metric. As shown in FIG. 13, the method 1300 includes steps 1301 to 1306.

1301. An access network device #1 sends first configuration information #1 to an access stratum of the terminal device.

1302. The access stratum of the terminal device sends the first configuration information #1 to an upper layer of the access stratum.

Herein, for step 1301 and step 1302, refer to the descriptions of step 1201 and step 1202 in FIG. 12. Details are not described again.

1303. The CN/OAM/EM sends first configuration information #2 to an access network device #2. Correspondingly, the access network device #2 receives the second configuration information #2.

For step 1303, refer to the descriptions of step 1204 in FIG. 12. Details are not described again.

1304. The access network device #2 sends the first configuration information #2 to the access stratum of the terminal device.

It should be noted that a sequence of step 1301 and step 1304 is not limited herein. For example, step 1301 may be performed before or after step 1304, or step 1301 and step 1304 may be simultaneously performed.

1305. The access stratum of the terminal device sends the first configuration information #2 to the upper layer.

For step 1304 and step 1305, refer to the descriptions of step 1208 and step 1209 in FIG. 12. Details are not described again.

1306. The upper layer of the access stratum uses a union set of the first configuration information #1 and the first configuration information #2 as a measurement configuration of QoE measurement.

In some embodiments, for a same measurement metric, if both the first configuration information #1 and the first configuration information #2 include configuration information of the measurement metric, measurement may be performed based on configuration information corresponding to the measurement metric in the first configuration information #2. This is not limited in this application.

In some embodiments, the upper layer of the access stratum of the terminal device may report a QoE measurement result in a reporting manner in the first configuration information #2. This is not limited in this application.

Therefore, in this embodiment of this application, when an access network device sends configuration information for QoE measurement to the terminal device based on a requirement of the access network device, and sends configuration information for QoE measurement to the terminal device based on a requirement of the CN/OAM/EM, the access network device may use the union set of the QoE measurement configuration triggered by the access network device and the QoE measurement configuration from the CN/OAM/EM as the measurement configuration of the QoE measurement, helping ensure that QoE measurement is performed based on the requirement of the CN/OAM/EM and the requirement of the access network device.

Refer to FIG. 14. In the method 1400, a terminal device may separately perform QoE measurement based on a QoE measurement configuration triggered by an access network device and a QoE measurement configuration from a CN/OAM/EM. As shown in FIG. 14, the method 1400 includes steps 1401 to 1410.

1401. An access network device #1 sends first configuration information #1 to an access stratum of the terminal device.

1402. The access stratum of the terminal device sends the first configuration information #1 to an upper layer of the access stratum.

1403. The CN/OAM/EM sends first configuration information #2 to an access network device #2. Correspondingly, the access network device #2 receives the second configuration information #2.

1404. The access network device #2 sends the first configuration information #2 to the access stratum of the terminal device.

1405. The access stratum of the terminal device sends the first configuration information #2 to the upper layer.

For step 1401 to step 1405, refer to the descriptions of step 1301 to step 1305 in FIG. 13. Details are not described again.

1406. The upper layer of the access stratum separately processes the first configuration information #1 and the first configuration information #2.

In other words, the upper layer of the access stratum of the terminal device has two sets of QoE measurement configurations, and the two sets of QoE measurement configurations may be for performing independent measurement. For example, QoE measurement may be performed based on the first configuration information #1 to obtain a measurement result corresponding to the first configuration information

1, and QoE measurement may be performed based on the first configuration information #2 to obtain a measurement result corresponding to the first configuration information #2.

Optionally, the upper layer of the access stratum of the terminal device may further separately report the QoE measurement results obtained based on the foregoing two sets of QoE measurement configurations.

1407. The upper layer of the access stratum of the terminal device sends the measurement result corresponding to the first configuration information #1 to the access stratum.

1408. The access stratum of the terminal device sends the measurement result corresponding to the first configuration information #1 to the access network device #1.

1409. The upper layer of the access stratum of the terminal device sends the measurement result corresponding to the first configuration information #2 to the access stratum.

1410. The access stratum of the terminal device sends the measurement result corresponding to the first configuration information #2 to the access network device #2.

Therefore, in this embodiment of this application, when an access network device sends configuration information for QoE measurement to the terminal device based on a requirement of the access network device, and sends configuration information for QoE measurement to the terminal device based on a requirement of the CN/OAM/EM, the access network device may separately process the QoE measurement configuration triggered by the access network device and the QoE measurement configuration from the CN/OAM/EM, helping ensure that QoE measurement is performed based on the requirement of the CN/OAM/EM and the requirement of the access network device.

It may be understood that, in the foregoing embodiments of this application, the method implemented by the access network device may alternatively be implemented by a component (for example, a chip or a circuit) that can be used in the access network device, and the method implemented by the terminal device may alternatively be implemented by a component (for example, a chip or a circuit) that can be used in the terminal device.

Figure 15:
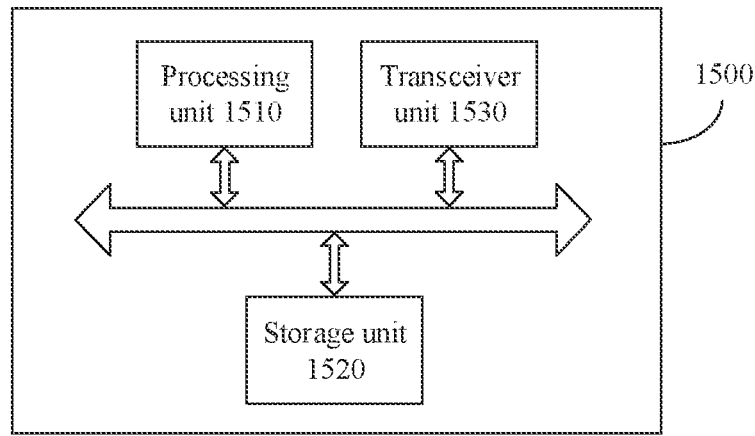
FIG. 15 is a schematic diagram of a wireless communication apparatus according to an embodiment of this application.

According to the foregoing methods. FIG. 15 is a schematic diagram of a wireless communication apparatus 1500 according to an embodiment of this application.

In some embodiments, the apparatus 1500 may be an access network device, or may be a chip or a circuit, for example, a chip or a circuit that may be disposed in an access network. In some embodiments, the apparatus 1500 may be a terminal device, or may be a chip or a circuit, for example, a chip or a circuit that may be deployed in the terminal device.

The apparatus 1500 may include a processing unit 1510 (an example of a processor) and a transceiver unit 1530.

Optionally, the transceiver unit 1530 may be implemented using a transceiver, a transceiver-related circuit, or an interface circuit.

Optionally, the apparatus may further include a storage unit 1520. In a possible manner, the storage unit 1520 is configured to store instructions. Optionally, the storage unit may alternatively be configured to store data or information. The storage unit 1520 may be implemented using a memory.

In a possible design, the processing unit 1510 may be configured to execute the instructions stored in the storage unit 1520, to enable the apparatus 1500 to implement the steps performed by the access network device in the foregoing methods.

Further, the processing unit 1510, the storage unit 1520, and the transceiver unit 1530 may communicate with each other through an internal connection path for transmission of control signals and/or data signals. For example, the storage unit 1520 is configured to store a computer program. The processing unit 1510 may be configured to invoke the computer program from the storage unit 1520 and run the computer program, to control the transceiver unit 1530 to receive a signal and/or send a signal, to complete the steps of the access network device in the foregoing methods.

In a possible design, the processing unit 1510 may be configured to execute the instructions stored in the storage unit 1520, to enable the apparatus 1500 to implement the steps performed by the terminal device in the foregoing methods.

Further, the processing unit 1510, the storage unit 1520, and the transceiver unit 1530 may communicate with each other through an internal connection path for transmission of control signals and/or data signals. For example, the storage unit 1520 is configured to store a computer program. The processing unit 1510 may be configured to invoke the computer program from the storage unit 1520 and run the computer program, to control the transceiver unit 1530 to receive a signal and/or send a signal, to complete the steps of the terminal device in the foregoing methods.

The storage unit 1520 may be integrated into the processing unit 1510, or may be deployed separately from the processing unit 1510.

Optionally, if the apparatus 1500 is a communication device, the transceiver unit 1530 may include a receiver and a transmitter. The receiver and the transmitter may be a same physical entity or different physical entities. When the receiver and the transmitter are a same physical entity, the receiver and the transmitter may be collectively referred to as a transceiver.

Optionally, if the apparatus 1500 is the chip or the circuit, the transceiver unit 1530 may include an input interface and an output interface.

In an implementation, a function of the transceiver unit 1530 may be considered to be implemented using a transceiver circuit or a transceiver-dedicated chip. It may be considered that the processing unit 1510 is implemented using a dedicated processing chip, a processing circuit, a processing unit, or a general-purpose chip.

In another implementation, it may be considered that the communication device (for example, an access network device or a terminal device) provided in this embodiment of this application is implemented using a general-purpose computer. That is, program code for implementing functions of the processing unit 1510 and the transceiver unit 1530 is stored in the storage unit 1520, and the general-purpose processing unit implements the functions of the processing unit 1510 and the transceiver unit 1530 by executing the code in the storage unit 1520.

In some embodiments, when the apparatus 1500 is an access network device or a chip or a circuit disposed in the access network device, the transceiver unit 1530 is configured to receive first configuration information, where the first configuration information indicates a terminal device to perform application layer quality of experience QoE measurement. The processing unit 1510 is configured to generate second configuration information, where the second configuration information is used by the access network device to indicate the terminal device to report measurement results of at least a part of measurement metrics obtained through the QoE measurement. The transceiver unit 1530 is further configured to send the first configuration information and the second configuration information to a terminal device.

Optionally, the second configuration information further includes a configuration of a reporting event for the measurement metrics, where the reporting event is that measurement values of the measurement metrics are higher than a first threshold or the measurement values of the measurement metrics are lower than a second threshold.

Optionally, the second configuration information further includes first indication information, and the first indication information indicates the terminal device to report the measurement values of the measurement metrics.

Optionally, the second configuration information further includes a reporting period for reporting the measurement results of the at least part of measurement metrics by the terminal device.

Optionally, the transceiver unit 1530 is further configured to receive second indication information from the terminal device or a core network device, where the second indication information indicates a service type for which the terminal device prefers to perform QoE measurement, indicates that the terminal device prefers to perform QoE measurement, or indicates a measurement metric on which the terminal device prefers to perform QoE measurement.

Optionally, the transceiver unit 1530 is further configured to receive third indication information from the terminal device, where the third indication information indicates a service type for which the terminal device prefers to perform QoE measurement, indicates that the terminal device prefers to perform QoE measurement, or indicates a measurement metric on which the terminal device prefers to perform QoE measurement.

The transceiver unit 1530 is further configured to send the third indication information to a core network device.

Optionally, the transceiver unit 1530 is further configured to receive fourth indication information from the core network device, an operation, administration and maintenance OAM, or an element manager, where the fourth indication information indicates at least one measurement metric measured by the terminal device when the terminal device performs the QoE measurement.

The processing unit 1510 is specifically configured to generate the second configuration information based on the fourth indication information.

Optionally, the transceiver unit 1530 is further configured to receive the measurement results of the at least part of measurement metrics from the terminal device, where the measurement results of the measurement metrics include at least one of the reporting event, the measurement values of the measurement metrics, or a measurement result obtained through the QoE measurement.

The transceiver unit 1530 is further configured to receive a first message sent by the terminal device, where the first message includes the measurement results of the at least part of measurement metrics and the measurement result obtained through the QoE measurement.

Optionally, the measurement metric includes at least one of an average throughput, an initial playout delay, a buffer level, a playout delay, a deterioration duration, a number of successively lost packets, a jitter duration, a synchronization loss duration, a round-trip time delay, an average bitrate, and a presentation delay.

In some embodiments, when the apparatus 1500 is a terminal device or a chip or a circuit disposed in the terminal device, the transceiver unit 1530 is configured to receive, by an access stratum, first configuration information from a first access network device, where the first configuration information information indicates the terminal device to perform application layer quality of experience QoE measurement.

The transceiver unit 1530 is further configured to receive, by the access stratum, second configuration information from the first access network device, where the second configuration information is used by the access network device to indicate the terminal device to report measurement results of at least a part of measurement metrics obtained through the QoE measurement.

The processing unit 1510 is configured to send, by the access stratum, first information to an upper layer of the access stratum based on the first configuration information, where the first information indicates the upper layer to perform the application layer quality of experience QoE measurement.

The processing unit 1510 is further configured to send, by the access stratum, second information to the upper layer of the access stratum based on the second configuration information, where the second information indicates the upper layer to report the measurement results of the at least part of measurement metrics obtained through the QoE measurement.

Optionally, the second configuration information further includes a configuration of a reporting event for the measurement metrics, where the reporting event is that measurement values of the measurement metrics are higher than a first threshold or the measurement values of the measurement metrics are lower than a second threshold.

Optionally, when the measurement values of the measurement metrics satisfy the reporting event, the processing unit 1510 is further configured to send, by the upper layer, the measurement results of the at least part of measurement metrics to the access stratum, where the measurement results of the measurement metrics include the reporting event or a measurement result obtained through the QoE measurement.

The transceiver unit 1530 is further configured to send, by the access stratum, the measurement results of the at least part of measurement metrics to a second access network device.

Optionally, the second configuration information further includes first indication information, and the first indication information indicates the terminal device to report the measurement values of the measurement metrics.

Optionally, the second configuration information further includes a reporting period for reporting the measurement results of the at least part of measurement metrics by the terminal device.

Optionally, the transceiver unit 1530 is further configured to send second indication information to the first access network device or a core network device, where the second indication information indicates a service type for which the terminal device prefers to perform QoE measurement, indicates that the terminal device prefers to perform QoE measurement, or indicates a measurement metric on which the terminal device prefers to perform QoE measurement.

Optionally, the processing unit 1510 is further configured to send, by the upper layer, a first message to the access stratum, where the first message includes the measurement results of the at least part of measurement metrics and the measurement result obtained through the QoE measurement.

The transceiver unit 1530 is configured to send, by the access stratum, the first message to a third access network device.

Optionally, the measurement metric includes at least one of an average throughput, an initial playout delay, a buffer level, a playout delay, a deterioration duration, a number of successively lost packets, a jitter duration, a synchronization loss duration, a round-trip time delay, an average bitrate, and a presentation delay.

The units in the foregoing embodiment may also be referred to as modules, circuits, or components.

Functions and actions of the modules or units in the apparatus 1500 listed above are merely examples for description. When the apparatus 1500 is configured in or is the access network device, the modules or the units in the apparatus 1500 may be configured to perform the actions or processing processes performed by the access network device in the foregoing methods. When the apparatus 1500 is configured in or is the terminal device, the modules or the units in the apparatus 1500 may be configured to perform the actions or processing processes performed by the terminal device in the foregoing methods.

For concepts, explanations, detailed descriptions, and other steps of the apparatus 1500 that are related to the technical solutions provided in embodiments of this application, refer to the descriptions of the content in the foregoing methods or other embodiments. Details are not described herein again.

Figure 16:
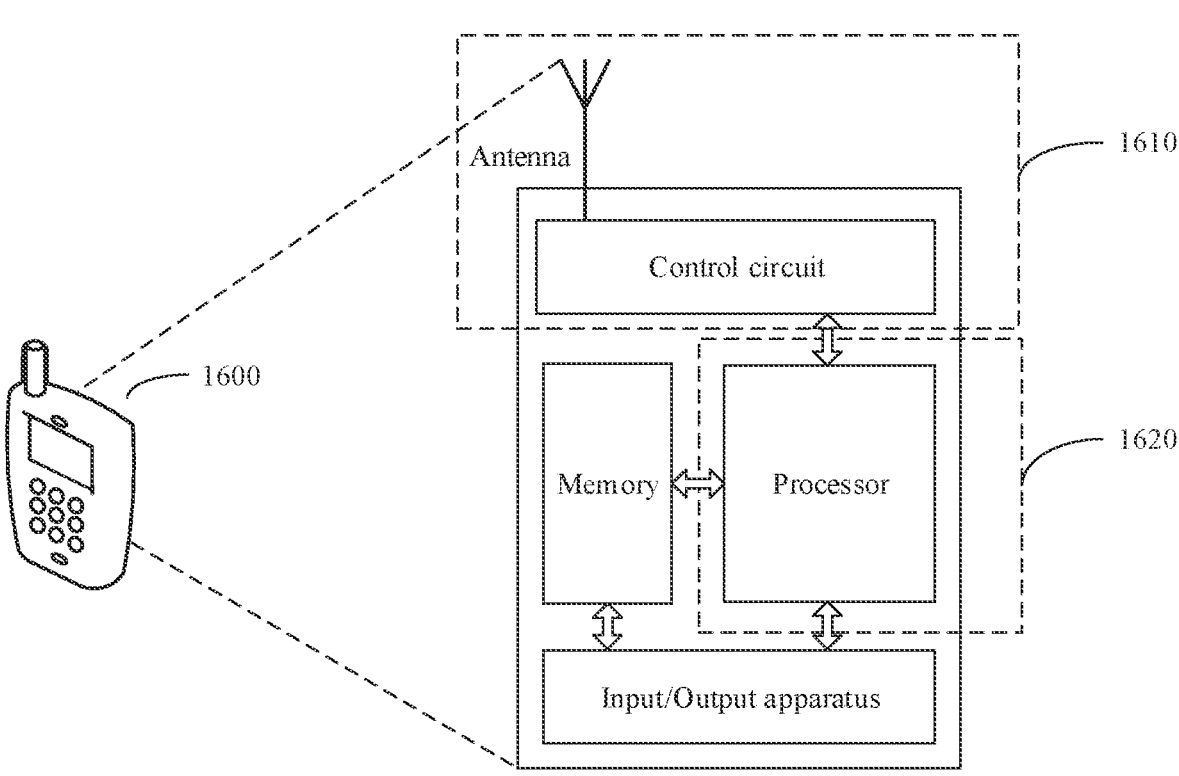
FIG. 16 is a schematic diagram of a structure of a terminal device according to this application.

FIG. 16 is a schematic diagram of a structure of a terminal device 1600 according to this application. The terminal device 1600 may perform the actions performed by the terminal device in the foregoing method embodiments.

For ease of description, FIG. 16 shows only main components of the terminal device. As shown in FIG. 16, the terminal device 1600 includes a processor, a memory, a control circuit, an antenna, and an input/output apparatus.

The processor is mainly configured to process a communication protocol and communication data, control the entire terminal device, execute a software program, and process data of the software program, for example, is configured to support the terminal device in performing the actions described in the foregoing embodiment of the indication method for transmitting a precoding matrix. The memory is mainly configured to store the software program and the data, for example, store a codebook described in the foregoing embodiment. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 16 shows only one memory and one processor. In an actual terminal device, there may be a plurality of processors and memories. The memory may also be referred to as a storage medium, a storage device, or the like. This is not limited in embodiments of this application.

For example, the processor may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit are integrated into the processor in FIG. 16. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna and the control circuit that have a transceiver function may be considered as a transceiver unit 1610 of the terminal device 1600, and the processor having a processing function may be considered as a processing unit 1620 of the terminal device 1600. As shown in FIG. 16, the terminal device 1600 includes the transceiver unit 1610 and the processing unit 1620. The transceiver unit 1610 may also be referred to as a transceiver, a transceiver machine, a transceiver apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. That is, the transceiver unit includes the receiving unit and the sending unit. For example, the receiving unit may also be referred to as a receiver, a receive machine, or a receiving circuit, and the sending unit may also be referred to as a transmitter, a transmit machine, or a transmitting circuit.

Figure 17:
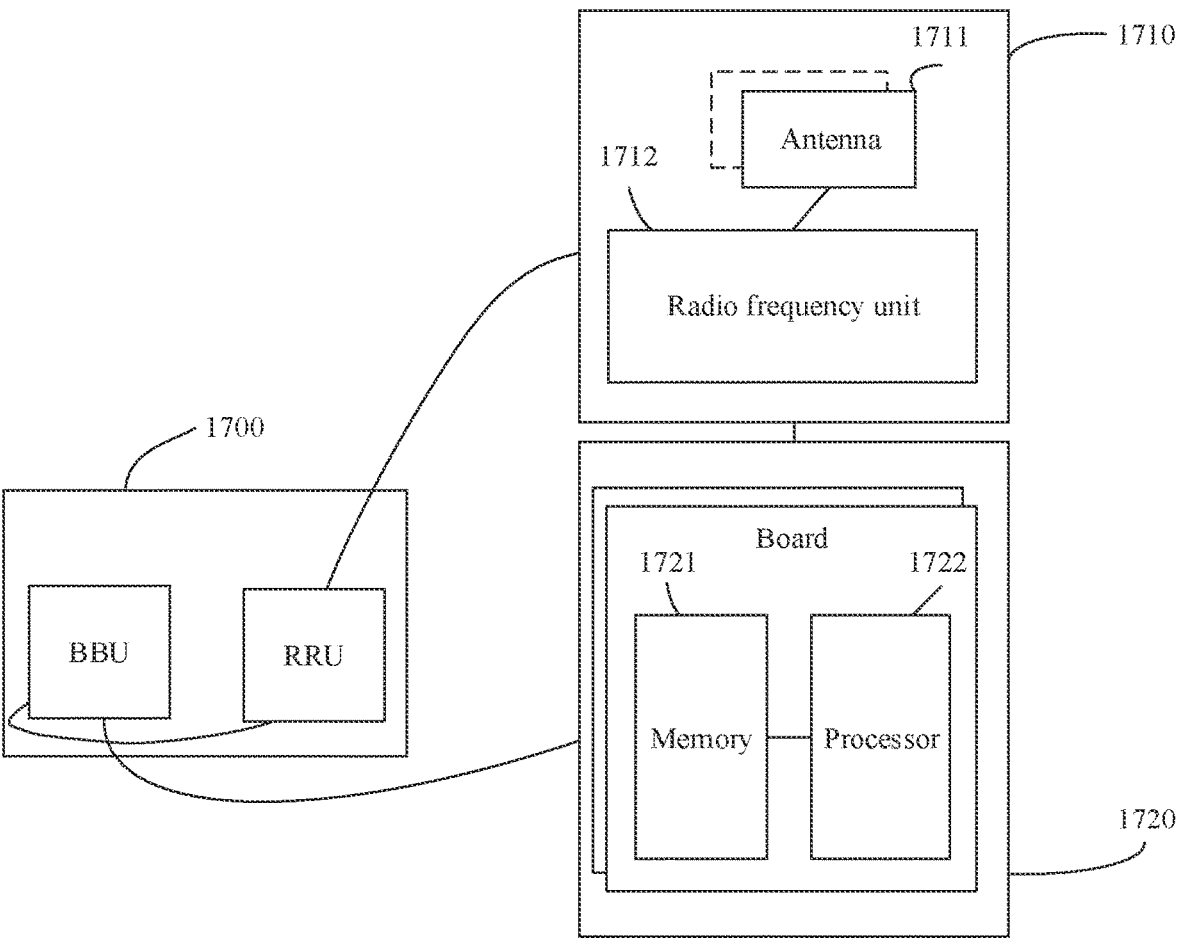
FIG. 17 is a schematic diagram of a structure of a network device according to an embodiment of this application.

FIG. 17 is a schematic diagram of a structure of a network device 1700 according to an embodiment of this application. The network device 1700 may be configured to implement functions of the access network device (for example, the first access network device or the second access network device) in the foregoing method. The network device 1700 includes one or more radio units such as a remote radio unit (remote radio unit, RRU) 1710 and one or more baseband units (baseband unit, BBU) (which may also be referred to as a digital unit, DU) 1720. The RRU 1710 may be referred to as a transceiver unit, a transceiver, a transceiver circuit, a transceiver, or the like, and may include at least one antenna 1711 and a radio unit 1712. The RRU 1710 part is mainly configured to: send and receive a radio frequency signal and perform conversion between a radio frequency signal and a baseband signal, for example, is configured to send the signaling message in the foregoing embodiments to a terminal device. The BBU 1720 is mainly configured to perform baseband processing, control a base station, and so on. The RRU 1710 and the BBU 1720 may be physically deployed together, or may be physically separated, that is, a distributed base station.

The BBU 1720 is a control center of the base station, may also be referred to as a processing unit, and is mainly configured to implement a baseband processing function, for example, channel coding, multiplexing, modulation, and spreading. For example, the BBU (the processing unit) 1720 may be configured to control the access network device to perform an operation procedure related to the access network device in the foregoing method embodiments.

In an example, the BBU 1720 may include one or more boards, and a plurality of boards may jointly support a radio access network (such as an LTE system or a 5G system) in a single access standard, or may separately support radio access networks in different access standards. The BBU 1720 further includes a memory 1721 and a processor 1722. The memory 1721 is configured to store necessary instructions and data. The processor 1722 is configured to control the access network device for necessary actions, for example, configured to control the access network device for an operation procedure related to the access network device in the foregoing method embodiments. The memory 1721 and the processor 1722 may serve one or more boards. In other words, a memory and a processor may be disposed on each board. Alternatively, a plurality of boards may share a same memory and a same processor. In addition, a necessary circuit may further be disposed on each board.

In a possible implementation, with development of a system-on-chip (system-on-chip, SoC) technology, all or some functions of the part 1720 and the part 1710 may be implemented using the SoC technology, for example, implemented using a base station function chip. The base station function chip integrates components such as a processor, a memory, and an antenna port. A program of a base station-related function is stored in the memory. The processor executes the program to implement the base station-related function. Optionally, the base station function chip can also read an external memory of the chip, to implement a related function of the base station.

It should be understood that the structure of the network device shown in FIG. 17 is merely a possible form, and should not constitute any limitation on embodiments of this application. This application does not exclude a possibility that a base station structure of another form may appear in the future.

According to the method provided in embodiments of this application, an embodiment of this application further provides a communication system, including the foregoing access network device and terminal device.

It should be understood that, the processor in embodiments of this application may be a central processing unit (central processing unit, CPU), or may be another general purpose processor, a digital signal processor (digital signal processor, DSP), an application-specific integrated circuit (application specific integrated circuit, ASIC), a field programmable gate array (field programmable gate array, FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through an example rather than a limitative description, random access memories (random access memory, RAM) in many forms may be used, for example, a static random access memory (static RAM, SRAM), a dynamic random access memory (dynamic random access memory. DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium that stores a computer program. When the computer program is executed by a computer, steps performed by the access network device or the terminal device in any one of the foregoing embodiments are implemented.

An embodiment of this application further provides a computer program product. When the computer program product is executed by a computer, steps performed by the access network device or the terminal device in any one of the foregoing embodiments are implemented.

An embodiment of this application further provides a system chip. The system chip includes a communication unit and a processing unit. The processing unit may be, for example, a processor. The communication unit may be, for example, an input/output interface, a pin, or a circuit. The processing unit may execute computer instructions, so that the chip in the communication apparatus performs steps performed by the access network device or the terminal device in the foregoing embodiments of this application.

Optionally, the computer instructions are stored in a storage unit.

Embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry instructions and/or data.

It should be understood that in the foregoing embodiments, terms such as "first" and "second" are merely intended to distinguish different objects, and should not constitute any limitation on this application.

It should be further understood that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by an access network device, first configuration information from another network device, wherein the first configuration information indicates a terminal device to perform application layer quality of experience (QoE) measurement, wherein the first configuration information indicates a first set of measurement metrics measured by the terminal device when the terminal device performs the QoE measurement;

generating, by the access network device, second configuration information, wherein the second configuration information indicates the terminal device to report measurement result of at least one measurement metric obtained through the QoE measurement and the second configuration information generated by the access network device indicates the terminal device to report a buffer level obtained through the QoE measurement, and wherein the second configuration information indicates the terminal device to report measurement results of a second set of measurement metrics obtained through the QoE measurement, wherein the second set is a subset of the first set, and the measurement results of the second set of measurement metrics obtained through the QoE measurement are visible to the radio access network device; and sending, by the access network device, the first configuration information received from the another network device and the second configuration information generated by the access network device to the terminal device.

2. The method according to claim 1, wherein the second configuration information further comprises first indication information, and the first indication information indicates the terminal device to report a measurement value of the at least one of measurement metric.

3. The method according to claim 1, wherein the second configuration information further comprises a reporting period for reporting the measurement result of the at least one measurement metric by the terminal device.

4. The method according to claim 1, further comprising:

receiving, the measurement result of the at least one measurement metric from the terminal device, wherein the measurement result comprises at least one of a reporting event, a measurement value of the measurement metric, or a measurement result obtained through the QoE measurement.

5. The method according to claim 1, further comprising:

receiving, a first message sent by the terminal device, wherein the first message comprises the measurement result of the at least one measurement metric and a measurement result obtained through the QoE measurement.

6. The method according to claim 1, wherein the at least one measurement metric comprises at least one of an average throughput, an initial playout delay, a playout delay, a deterioration duration, a number of successively lost packets, a jitter duration, a synchronization loss duration, a round-trip time delay, an average bitrate, or a presentation delay.

7. A communication method, comprising:

receiving, by a terminal device, first configuration information from a first access network device, wherein the first configuration information indicates the terminal device to perform application layer quality of experience (QoE) measurement and the first configuration information is originated from another network device wherein the first configuration information indicates a first set of measurement metrics measured by the terminal device when the terminal device performs the QoE measurement;

receiving, by the terminal device, second configuration information from the first access network device, wherein the second configuration information indicates the terminal device to report measurement result of at least one measurement metric obtained through the QoE measurement, and the second configuration information generated by the access network device indicates the terminal device to report a buffer level obtained through the QoE measurement, and wherein the second configuration information indicates the terminal device to report measurement results of a second set of measurement metrics obtained through the QoE measurement, wherein the second set is a subset of the first set, and the measurement results of the second set of measurement metrics obtained through the QoE measurement are visible to the radio access network device;

sending, by the terminal device, first information to an upper layer of the terminal device based on the first configuration information, wherein the first information indicates the upper layer to perform the application layer quality of experience QoE measurement; and sending, by the terminal device, second information to the upper layer based on the second configuration information, wherein the second information indicates the upper layer to report the measurement result of the at least one measurement metric obtained through the QoE measurement.

8. The method according to claim 7, wherein the second configuration information further comprises first indication information, and the first indication information indicates the terminal device to report a measurement value of the at least one of measurement metric.

9. The method according to claim 7, wherein the second configuration information further comprises a reporting period for reporting the measurement result of the at least one measurement metric by the terminal device.

10. The method according to claim 7, further comprising:

sending, by the upper layer, a first message, wherein the first message comprises the measurement result of the at least one measurement metric and a measurement result obtained through the QoE measurement; and sending, by the terminal device, the first message to a third access network device.

11. The method according to claim 7, wherein the at least one measurement metric comprises at least one of an average throughput, an initial playout delay, a playout delay, a deterioration duration, a number of successively lost packets, a jitter duration, a synchronization loss duration, a round-trip time delay, an average bitrate, or a presentation delay.

12. A first communication apparatus, comprising:

at least one processor; and one or more memories including computer instructions that, when executed by the at least one processor, cause the first communication apparatus to perform operations comprising:

receiving, first configuration information from another network device, wherein the first configuration information indicates a terminal device to perform application layer quality of experience (QoE) measurement, wherein the first configuration information indicates a first set of measurement metrics measured by the terminal device when the terminal device performs the QoE measurement;

generating, second configuration information, wherein the second configuration information indicates the terminal device to report measurement result of at least one measurement metric obtained through the QoE measurement and the second configuration information generated by the first communication apparatus indicates the terminal device to report a buffer level obtained through the QoE measurement, and wherein the second configuration information indicates the terminal device to report measurement results of a second set of measurement metrics obtained through the QoE measurement, wherein the second set is a subset of the first set, and the measurement results of the second set of measurement metrics obtained through the QoE measurement are visible to the radio access network device; and sending, the first configuration information received from the another network device and the second configuration information generated by the first communication apparatus to the terminal device.

13. The first communication apparatus according to claim 12, wherein the second configuration information further comprises first indication information, and the first indication information indicates the terminal device to report a measurement value of the at least one of measurement metric.

14. The first communication apparatus according to claim 12, wherein the second configuration information further comprises a reporting period for reporting the measurement result of the at least one measurement metric by the terminal device.

15. The first communication apparatus according to claim 12, wherein the operations further comprise:

receiving the measurement result of the at least one measurement metric from the terminal device, wherein the measurement result comprises at least one of a reporting event, a measurement value of the measurement metric, or a measurement result obtained through the QoE measurement.

16. The first communication apparatus according to claim 12, wherein the operations further comprise:

receiving, a first message sent by the terminal device, wherein the first message comprises the measurement result of the at least one measurement metric and a measurement result obtained through the QoE measurement.

17. The first communication apparatus according to claim 12, wherein the at least one measurement metric comprises at least one of an average throughput, an initial playout delay, a playout delay, a deterioration duration, a number of successively lost packets, a jitter duration, a synchronization loss duration, a round-trip time delay, an average bitrate, or a presentation delay.

18. A second communication apparatus, comprising:

at least one processor; and one or more memories including computer instructions that, when executed by the at least one processor, cause the second communication apparatus to perform operations comprising:

receiving, by second communication apparatus, first configuration information from a first access network device, wherein the first configuration information indicates the second communication apparatus to perform application layer quality of experience (QoE) measurement and the first configuration information is originated from another network device, wherein the first configuration information indicates a first set of measurement metrics measured by the second communication apparatus when the second communication apparatus performs the QoE measurement;

receiving, by the second communication apparatus, second configuration information from the first access network device, wherein the second configuration information indicates the second communication apparatus to report measurement result of at least one measurement metric obtained through the QoE measurement and the second configuration information generated by the first access network device indicates the second communication apparatus to report a buffer level obtained through the QoE measurement, and wherein the second configuration information indicates the second communication apparatus to report measurement results of a second set of measurement metrics obtained through the QoE measurement, wherein the second set is a subset of the first set, and the measurement results of the second set of measurement metrics obtained through the QoE measurement are visible to the radio access network device;

sending, by the second communication apparatus, first information to an upper layer of the second communication apparatus based on the first configuration information, wherein the first information indicates the upper layer to perform the application layer quality of experience QoE measurement; and sending, by the second communication apparatus, second information to the upper layer of the second communication apparatus based on the second configuration information, wherein the second information indicates the upper layer to report the measurement result of the at least one measurement metric obtained through the QoE measurement.

19. The second communication apparatus according to claim 18, wherein the second configuration information further comprises first indication information, and the first indication information indicates the second communication apparatus to report a measurement value of the at least one of measurement metric.

20. The second communication apparatus according to claim 18, wherein the second configuration information further comprises a reporting period for reporting the measurement result of the at least one measurement metric by the second communication apparatus.

21. The second communication apparatus according to claim 18, wherein the operations further comprise:

sending, by the upper layer, a first message, wherein the first message comprises the measurement result of the at least one measurement metric and a measurement result obtained through the QoE measurement; and sending, by the second communication apparatus, the first message to a third access network device.

22. The second communication apparatus according to claim 18, wherein the at least one measurement metric comprises at least one of an average throughput, an initial playout delay, a playout delay, a deterioration duration, a number of successively lost packets, a jitter duration, a synchronization loss duration, a round-trip time delay, an average bitrate, or a presentation delay.

* * * * *